(12) United States Patent
Sakai et al.

(10) Patent No.: US 7,895,040 B2
(45) Date of Patent: Feb. 22, 2011

(54) DEVICE AND METHOD OF MODELING ACOUSTIC CHARACTERISTICS WITH HMM AND COLLATING THE SAME WITH A VOICE CHARACTERISTIC VECTOR SEQUENCE

(75) Inventors: Masaru Sakai, Kanagawa (JP); Shinichi Tanaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 998 days.

(21) Appl. No.: 11/694,547

(22) Filed: Mar. 30, 2007

(65) Prior Publication Data
US 2008/0281595 A1  Nov. 13, 2008

(30) Foreign Application Priority Data
Jul. 4, 2006 (JP) .............................. 2006-185002

(51) Int. Cl.
*G10L 15/14* (2006.01)
*G10L 15/28* (2006.01)
*G10L 15/00* (2006.01)

(52) U.S. Cl. .................... 704/256.4; 704/240; 704/242; 704/255; 704/256; 704/256.1

(58) Field of Classification Search ........................ None
See application file for complete search history.

(56) References Cited

U.S. PATENT DOCUMENTS

| | | | |
|---|---|---|---|
| 5,805,772 A | * | 9/1998 | Chou et al. .................. 704/255 |
| 5,991,720 A | * | 11/1999 | Galler et al. ............. 704/256.5 |
| 6,574,595 B1 | * | 6/2003 | Mitchell et al. ............. 704/242 |
| 6,725,196 B2 | * | 4/2004 | Keiller et al. ................ 704/242 |
| 6,963,837 B1 | * | 11/2005 | Finke et al. .................. 704/256 |

FOREIGN PATENT DOCUMENTS

JP           3251480           11/2001

OTHER PUBLICATIONS

Woszczyna, Monika. "Fast speaker independent large vocabulary continuous speech recognition" (1998), Karlsruhe, University, Diss., 1998.*
Nakagawa et al, Comparison Between Beam Search and A Search Methods for Speech Recognition, Technical Report of IEICE SP96-12, 1996.
Tanabe et al, Speech, Hidden Markov Model for Speech Recognition, Chap. 5.4, 2004, pp. 196-204.

* cited by examiner

*Primary Examiner*—Matthew J Sked
(74) *Attorney, Agent, or Firm*—Turocy & Watson, LLP

(57) ABSTRACT

According to an embodiment, voice recognition apparatus includes units of: acoustic processing, voice interval detecting, dictionary, collating, search target selecting, storing and determining, and voice recognition method includes processes of: selecting a search range on basis of a beam search, setting and storing a standard frame, storing an output probability of a certain transition path, determining whether or not the output probability of a certain path is stored. Number of times of calculation of the output probability is reduced by selecting the search range on basis of the beam search, calculating the output probability of the certain transition path only once in an interval from when the standard frame is set to when the standard frame is renewed, and storing and using thus calculated value as an approximate value of the output probability in subsequent frames.

9 Claims, 17 Drawing Sheets

*Prior Art*

SET OF INITIAL STATES SS = { S1 }
SET OF FINAL STATES SF = { S4 }

SET OF INITIAL STATES SS = { S1 }
SET OF FINAL STATES SF = { S4 }

*Prior Art*

*Prior Art*      ⟶ : TRANSITION PATH WHOSE OUTPUT PROBABILITY IS TO BE CALCULATED ⊘ : STATE BELONGING TO STATE SET SA
○ : STATE BELONGING TO STATE SET SB
   (STATE HAVING SIGNIFICANT FORWARD
   PROBABILITY)

→ : TRANSITION PATH WHOSE OUTPUT
    PROBABILITY IS TO BE CALCULATED

*Prior Art*

*Prior Art*

⊘ : STATE BELONGING TO STATE SET SA   → : TRANSITION PATH WHOSE OUTPUT PROBABILITY IS TO BE CALCULATED

○ : STATE BELONGING TO STATE SET SB (STATE HAVING SIGNIFICANT FORWARD PROBABILITY)   --→ : TRANSITION PATH IN WHICH OUTPUT PROBABILITY CALCULATED IN STANDARD FRAME IS USED AS APPROXIMATE VALUE

SET OF INITIAL STATES SS = { S1 }
SET OF FINAL STATES SF = { S4 }

SET OF INITIAL STATES SS = { S1 }
SET OF FINAL STATES SF = { S4 }

DEVICE AND METHOD OF MODELING ACOUSTIC CHARACTERISTICS WITH HMM AND COLLATING THE SAME WITH A VOICE CHARACTERISTIC VECTOR SEQUENCE

CROSS-REFERENCE TO RELATED APPLICATIONS

This application is based upon and claims the benefit of priority from the prior Japanese Patent Application No. 2006-185002, filed on Jul. 4, 2006; the entire contents of which are incorporated herein by reference.

TECHNICAL FIELD

The present invention relates to a voice recognition method that models acoustic characteristics with HMM (Hidden Markov Model) and collates the same with a voice characteristic vector sequence.

BACKGROUND OF THE INVENTION

As a conventional voice recognition method, widely employed is a method of modeling acoustic characteristics with HMM and collating the same with a voice characteristic vector sequence expressing the voice characteristics at each frame having a certain temporal width, as described in Yukinori Takubo et al, 2004 "Science of languages 2, Voice", Iwanami Shoten, (Takubo et al). In this voice recognition method, acoustic characteristics are modeled by HMM for each of a plurality of categories to be recognized and are collated with a voice characteristic vector sequence to find an HMM having a highest output probability of the voice characteristic vector sequence, and the category assigned to the HMM is outputted as a recognition result.

As a conventional method of efficiently reducing the number of times of calculation of the output probability, there is a method on the basis of a beam search, please see for example, Masaki Ida and Seiichi Nakagawa (1996), "Comparison between a beam search method and A* searching method in voice recognition", The institute of Electronics, Information and Communication Engineers, Technical Report of "Voice" SP96-12, (to be referred as Ida and Nakagawa); and there is a method on the basis of standard frames (for example, Japanese Issued Patent No. 3251480).

However, the number of times of calculation of the output probability cannot be reduced efficiently only by simply combining the methods of reducing the number of times of calculation on the basis of the beam search and on the basis of the standard frame.

BRIEF SUMMARY OF THE INVENTION

In view of the above, it is aimed to provide a voice recognition apparatus and method in which the number of times of calculation of an output probability is reduced efficiently without giving adverse effects to its voice recognition performance by combining a method on the basis of a beam search and a method on the basis of a standard frame.

According to embodiments of the present invention, there is provided an apparatus for recognizing voice from a supplied voice signal using an HMM (Hidden Markov Model) including: an acoustic processing unit configured to acquire voice characteristic vectors for each frames having a constant time width from the voice signal; a standard frame storage unit configured to determine one of the respective frames as a standard frame and store the number of the standard frame; a standard frame renewing unit configured to, when an arbitrary number of frames have passed over from the standard frame, reset and renew the standard frame to a frame which comes the arbitrary number of frames after the standard frame, and continue the renewal to the last frame in sequence; a first search range selecting unit configured to select a first search range of the HMM on the basis of a beam search for the standard frame; a first output probability calculating unit configured to calculate first output probabilities of voice characteristic vectors in respective transition paths within the first search range; a first output probability storage unit configured to store results of calculation of the first output probabilities combined with the respective transition paths; a first output probability erasing unit configured to erase all the results of calculation of the first output probabilities stored combined with the transition paths when the standard frame is renewed; a second search range selecting unit configured to select a second search range of the HMM in the respective frames on the basis of the beam search for the respective frames within an interval from the standard frame to a new standard frame to be renewed next when the standard frame is not renewed; a determining unit configured to determine whether the results of calculation of the first output probabilities in the respective transition paths within the second search range in the current frame, which is the selected frame, or the results of calculation of second output probabilities, described later, relating to past frames existing between the standard frame and the current frame are stored combined with the transition paths; an approximate value setting unit configured to set the results of calculation of the first output probabilities relating to the past frames between the standard frame and the current frame or the results of calculation of the second output probabilities, described later, as approximate values of the second output probabilities of the transition paths when the results of calculation of the first output probabilities or the results of calculation of the second output probabilities, described later, relating to the past frames between the standard frame and the current frame are stored; a second output probability calculating unit configured to calculate the second output probabilities of the voice characteristic vectors in the current frame of the transition paths or in the standard frame when the results of calculation of the first output probabilities and the results of calculation of the second output probabilities, described later, in an interval from the standard frame to a frame immediately before the current frame; a second output probability storage unit configured to store the results of calculation of the second output probabilities anew combined with the transition paths; a second output probability erasing unit configured to erase all the results of calculation of the second output probabilities stored combined with the transition paths when the standard frame is renewed; a forward probability calculating unit configured to calculate the forward probabilities of the current frame from the forward probabilities of the previous frame calculated in advance, all the approximate values of the current frame and all the second output probabilities; and a voice recognizing unit configured to calculate the forward probabilities of the respective HMM until the last frame and then provides a category assigned to the HMM which provides a largest forward probability for the last frame as a result of the voice recognition.

According to embodiments of the present invention, the number of times of calculation of the output probability is reduced efficiently without giving an adverse effect to the voice recognition performance by using both a method on the basis of the beam search and a method on the basis of the standard frame.

DETAILED DESCRIPTION OF THE INVENTION

Voice recognition apparatus and method omitted with some characteristic features of the present invention will be described on first hand, as premises for understanding of the embodiments of the invention.

Non-Embodiment Apparatuses and Methods

Referring now to FIG. 1 to FIG. 13, the voice recognition apparatuses and methods omitted with the characteristic features will be described.

(1) Configuration of Voice Recognition Apparatus

Figure 1:
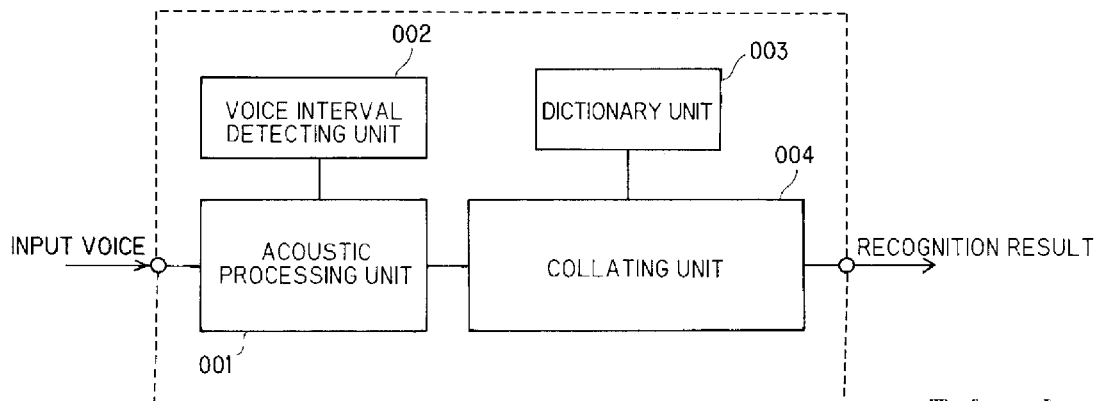
FIG. 1 is a block diagram of a preferable non-embodiment voice recognition apparatus 1.

FIG. 1 is a block diagram showing an example of the configuration of the non-embodiment voice recognition apparatus.

The voice recognition apparatus in FIG. 1 includes an acoustic processing unit 001, a voice interval detecting unit 002, a dictionary unit 003 and a collating unit 004.

(1-1) Acoustic Processing Unit 001

The acoustic processing unit 001 generates a time sequence $X=(x(1), x(2), \ldots x(T))$ of voice characteristic vectors from input voice signals, respectively for each frame having a certain temporal width. The sign $x(t)$ designates a voice characteristic vector in a frame "t", where $1 \leq t \leq T$, $t=1$ corresponds to a beginning of a voice detected by the voice interval detecting unit 002, described later, and $t=T$ corresponds to the end of the voice. The voice characteristic vector $x(t)$ is a vector having plural elements or higher than one dimension, and expresses characteristics of a voice in the frame "t". The "frame t" means "t"th frame or the frame No. t.

(1-2) Voice Interval Detecting Unit 002

The voice interval detecting unit 002 detects a voice interval (beginning and end of the voice) from the input voice signal.

(1-3) Dictionary Unit 003

The dictionary unit 003 stores a plurality of HMMs assigned to different categories. The HMM is defined by: one or more state Si ($i=1, 2, \ldots, NS$); a set of initial state SS and a set of final state SF; a transition probability Aji from a certain state Sj to a certain state Si; a function of probability density Bji( ) for giving an output probability Bji(x) of the voice characteristic vector x in a transition path from the certain state Sj to the certain state Si; and an initial probability Pi ($i=1, 2, \ldots, NS$) of the respective one of the states Si; where $1 \leq i, j \leq NS$, and NS is a total number of the states which constitutes the HMM.

Figure 2:
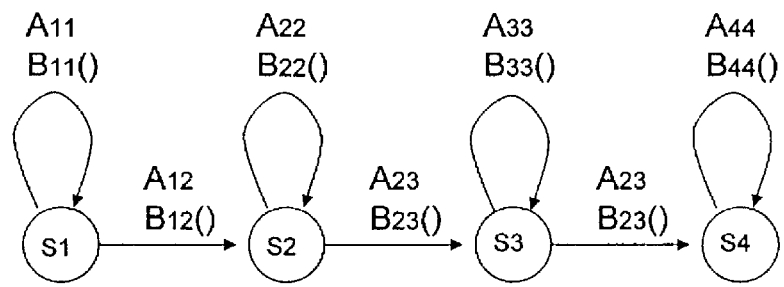
FIGS. 2-3 illustrate examples of HMM.
Figure 3:
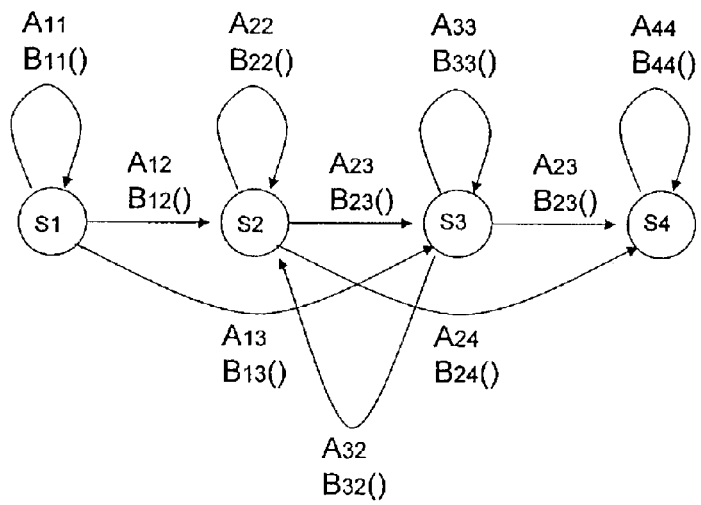

An example of the HMM will be shown in FIG. 2. FIG. 2 illustrates an example of the HMM having the number of states NS=4.

Description of the transition path in which the transition probability and the output probability are not significant is omitted. That is, description of the transition path in which the transition and output probabilities are always zero is omitted. The set of the initial states is S1, or SS={S1}; and the set of the final states is S4, or SF={S4}. The HMM in FIG. 2 is an example of the HMM which is typically used in the voice recognition having a structure referred to as "left-to-right type", in which the number of elements in the set of the initial states and the set of the final states are "1"; and has the transition probability Aji and the output probability Bji(x) which are significant only for the combinations (j, i) where i=j or i=j+1. The description will be continued below on the basis of the HMM shown in FIG. 2. However, the dictionary unit 003 can store any kinds of HMMs including the example in FIG. 2. For example, it can store also a HMM having a number of transition paths as in FIG. 3.

(1-4) Collating Unit 004

The collating unit 004 collates the HMM and the voice characteristic vector sequence. In other words, an output probability P(X|c) from the HMM assigned to a certain category "c" is calculated in respect of the time sequence $X(x(1), x(2), \ldots, x(t))$ of the voice characteristic vectors generated from the beginning to the end of the voice interval.

The collating unit 004 calculates the output probability P(X|c), ($1 \leq c \leq C$) from the categorized HMMs for each category, and the category assigned to the HMM which gives the maximum output probability is outputted as the recognition result. When expressing the output probability P(X|c) from the HMM assigned to a certain category "c" simply as P(X), P(X) is obtained by the expression (1), the expression (2), and the expression (3).

$$P(X) = \max_i \alpha(i, T) \quad (1)$$

where $Si \in SF$ $$\alpha(i, 0) = Pi \quad (2)$$

where $Si \in SS$

-continued $$\alpha(i, t) = \max_{j}(Aji * Bji(x(t)) * \alpha(j, t-1)) \quad (3)$$

for all $j$ where $\alpha(i,t)$ is a forward probability of the HMM which transits from the initial state and reaches the state Si in the frame "t". Since there are a plurality of transition paths starting from the initial state and reaching the state Si at the frame "t" in the HMM, the forward probability corresponds to a summation of the forward probabilities of the respective transition paths. However, in the expression (3), only one transition path which provides the largest forward probability is selected from the plurality of transition paths and the selected forward probability is used. This method is referred to as Viterbi method. The Viterbi method is known in the field of the voice recognition as a good approach to the method of finding a summation of forward probabilities of the plurality of transition paths.

(2) Processing of Collating Unit 004

Figure 4:
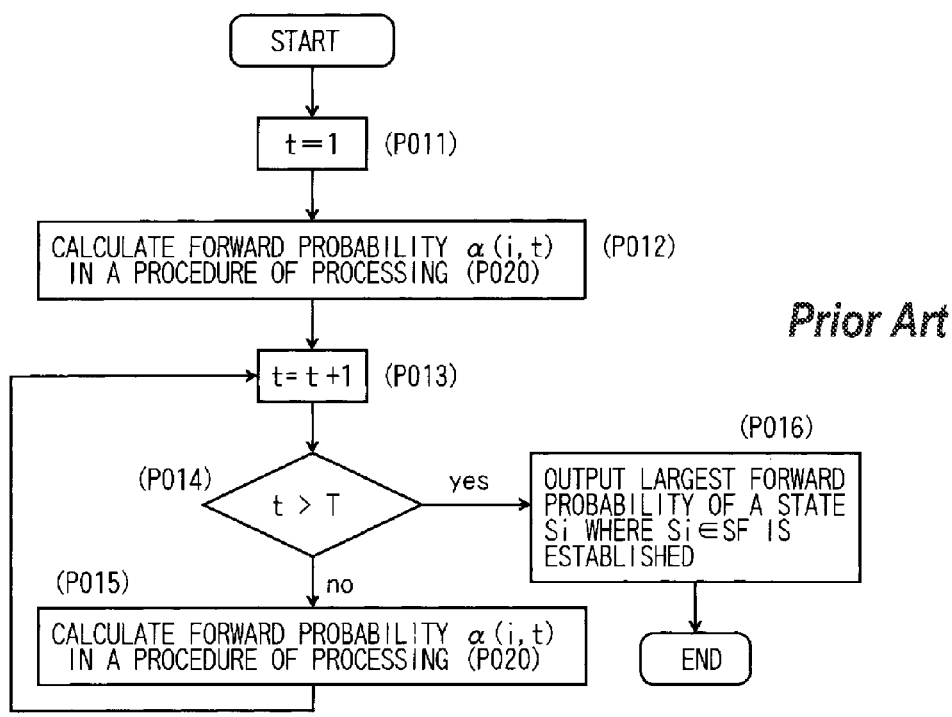
FIGS. 4-5 are flowcharts of the voice recognition apparatus 1.

Referring now to FIG. 4, the processing of the collating unit 004 will be described. FIG. 4 is a flowchart illustrating the processing in the collating unit 004 in the voice recognition apparatus shown in FIG. 1.

In Step P011, the frame number "t" is initialized to 1. In other words, the frame number is set to the beginning of the voice interval, and the processing is started from the beginning of the voice interval.

In Step P012, in accordance with the procedure in Step P020, a forward probability $\alpha(i, t)$ of the state Si of the HMM in the frame t is calculated. Details of Step P020 will be described later.

In Step P013, the frame number "t" is incremented by 1. In other words, the procedure goes to the processing in the next frame with t=t+1.

In Step P014, the frame number "t" is compared with the frame number "T" showing the end of the voice interval. When t>T, in other words, when the processing for all the frames in the voice interval is terminated, the procedure goes to Step P016. When t≦T, that is, when the frame t is a frame within the voice interval, the procedure goes to Step P015.

In Step P015, in accordance with the procedure in Step P020, the forward probability $\alpha(i, t)$ of the state Si of the HMM in the frame "t" is calculated. Details of Step P020 will be described later. When Step P020 is completed, the procedure goes back to Step P013.

In Step P016, the largest forward probability among the forward probabilities $\alpha(i, t)$ of the respective states satisfying Si∈SF is outputted as output probability P(X) of the voice characteristic vector sequence for this HMM on the basis of the expression (3).

(3) Calculation of Forward Probability

Subsequently, Step P020 which is a procedure for calculating the forward probability in Step P012 and Step P015 in FIG. 4 will be described using a flowchart in FIG. 5.

In Step P021, the loop execution of the step P022 is performed for all the combinations (j, i) where 1≦j, i≦NS, and when the loop execution is completed, the procedure goes to Step P023.

In Step P022, the output probability Bji(x(t)) in the frame "t" is calculated for a certain combination (j, i).

In Step P023, on the basis of the expression (2) and the expression (3), the forward probability $\alpha(i, t)$ in the frame "t" is calculated for each state Si in which 1≦i≦NS.

Figure 5:
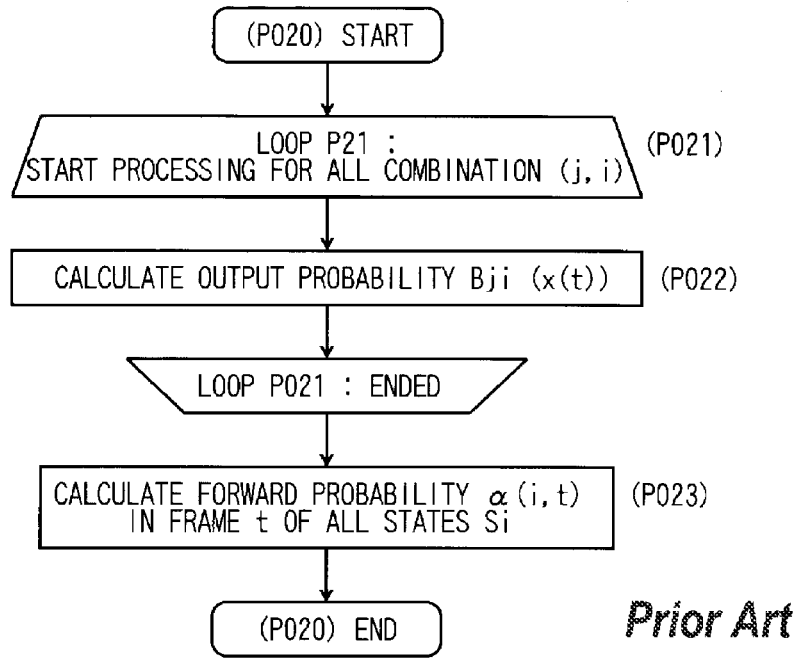

The voice recognition apparatus in FIG. 1 executes Steps P011 to P016 in FIG. 4 and Step P020 in FIG. 5 for a plurality of HMMs in the collating unit 004, and outputs the category assigned to the HMM which provides the largest output probability as the recognition result. The description given thus far is about the voice recognition apparatus in FIG. 1.

(4) Calculation of Output Probability Bji(x)

In the collating unit 004, it is necessary to calculate the output probabilities Bji(x) for all the transition paths corresponding to the combinations (j, i) where 1≦j, i≦NS of all the frames "t" where 1≦t≦T.

Figure 6:
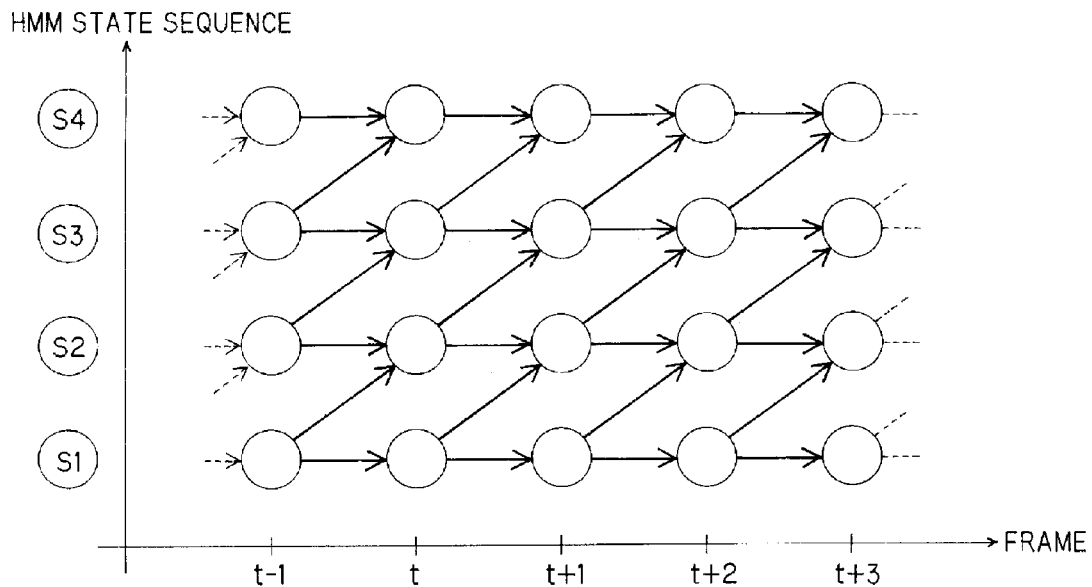
FIG. 6 is a schematic drawing illustrating a forward probability calculation in the voice recognition apparatus 1.

A general procedure of the calculation will be shown in FIG. 6. The vertical axis in FIG. 6 represents the state sequence of the HMM, which have the same transition paths as the HMM in FIG. 2 although similar illustration of the transition paths is omitted. The lateral axis represents the frames. In FIG. 6, the state transition of the HMM for each frame is expressed by; arranging the state sequences of the HMM for each frame, and expressing the transition paths of the HMM as arrows for connecting the two states between the adjacent frames. In FIG. 6, the transition paths for calculating the output probabilities in a certain range of frames are represented by thick arrows. As shown in FIG. 6, the collating unit 004 calculates the output probabilities in all the transition paths in all the frames.

In the voice recognition, in general, the ratio of the calculation cost for calculating the output probabilities with respect to the entire calculating cost of the voice recognition processing is extremely large, which may increase the calculation cost of the entire voice recognition processing. Therefore, reducing the number of times of calculation of the output probability efficiently is quite effective for reducing the calculation cost of the voice recognition processing.

As an existing method of reducing the number of times of calculation of the output probability efficiently, there are a method on the basis of the beam search as in Non-Patent document 2 and a method on the basis of the standard frame as in Japan's Issued Patent 3251480. These methods will be described below.

(5) Method on the Basis of Beam Search

A method of reducing the number of times of calculation of the output probability on the basis of the beam search will be described.

(5-1) Configuration of Voice Recognition Apparatus

Figure 7:
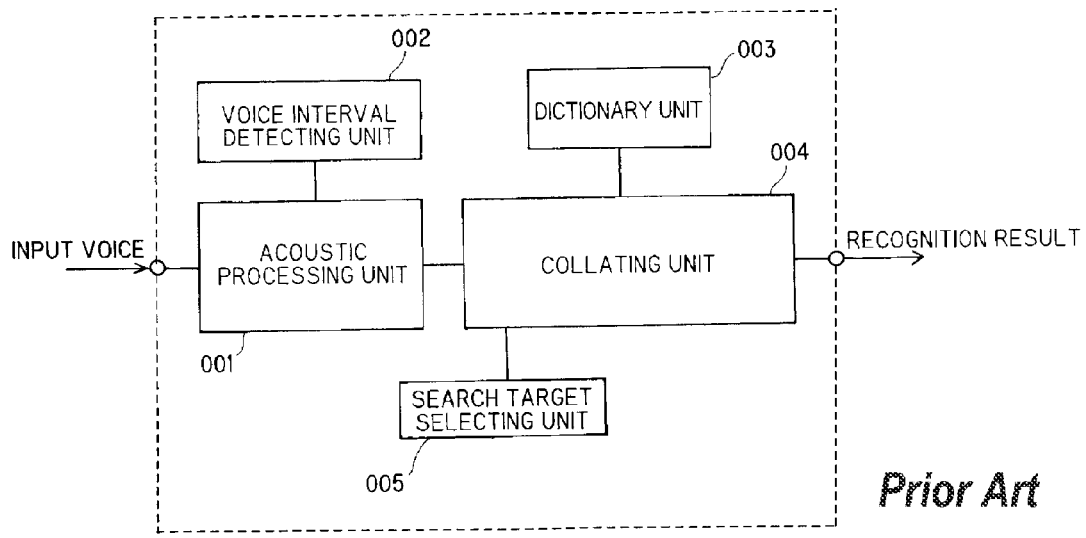
FIG. 7 is a block diagram of another preferable non-embodiment voice recognition apparatus 2.

FIG. 7 is a block diagram showing an example of the configuration of the voice recognition apparatus preferably for this method.

The voice recognition apparatus shown in FIG. 7 includes the acoustic processing unit 001, the voice interval detecting unit 002, the dictionary unit 003, and the collating unit 004 in the same manner as the voice recognition apparatus in FIG. 1, and in addition, a search target selecting unit 005.

The voice recognition apparatus in FIG. 7 perform the same processing as the voice recognition apparatus in FIG. 1 other than that the collating unit 004 operates in conjunction with the search target selecting unit 005. Therefore, in the description given below, only the operation of the collating unit 004 and the search target selecting unit 005 different from the voice recognition apparatus in FIG. 1 will be described.

(5-2) Search Target Selecting Unit 005

The search target selecting unit 005 executes the beam search for each frame, and selects the state set SA of the HMM and the state set SB of the HMM which can be transited from the state set SA. The state set SA in a certain frame "t"

is a set of NA states (number of states is NA) from the top having larger forward probability than others out of the states $Sj$ in which the significant forward probability $\alpha(j, t-1)$ which is not zero in frame "t–1" is not zero, where $1 \leq NA < NS$.

When the total number of all the states $Sj$ in which $\alpha(j, t-1)$ is not zero is smaller than NA, all the states $Sj$ in which $\alpha(j, t-1)$ is not zero are selected and defined to be the state set SA. The state set SB in the certain frame "t" is a set of all the states $Si$ which can be transited from all the states $Sj$ where $Sj \in SA$.

(5-3) Collating Unit 004

The collating unit 004 refers the state set SA and the state set SB selected by the search target selecting unit 005 when calculating the forward probability by the expression (3), calculates the output probabilities only for all the combinations (j, i) which satisfy $Sj \in SA$ and $Si \in SB$, and calculates the forward probabilities $\alpha(i, t)$ only for the states $Si$ which satisfy $Si \in SB$. More specifically, the expression (4) shown below is used instead of the expression (3)

$$\alpha(i, t) = \max_j (Aji * Bji(x(t)) * \alpha(j, t-1)) \quad (4)$$

where $\{j: Sj \in SA\}$ and $\{i: Si \in SB\}$

In the expression (4), the output probability $Bji(x(t))$ must simply be calculated only when the $Sj \in SA$ and $Si \in SB$ are satisfied, and the number of times of calculation of the output probability is reduced in comparison with the expression (3).

Here, the forward probabilities $\alpha(j, t-1)$ of the previous frame referred in the expression (4) are NA forward probabilities from the top (largest ones of number of NA) in the frame "t–1"; and it is expected that the states $Si$ that can be transited from the states $Sj$ having these largest forward probabilities also have the forward probabilities of the high level in the subsequent current frame "t".

Therefore, the transition paths going through the states having the forward probabilities of the high level in the respective frames are most probably the transition paths which provide the maximum value of the forward probability $\alpha(i, t)$ in the frame "t" obtained by the expression (1). This possibility increases with increase of the value of NA, and when NA=NS, there is no difference between the expression (3) and the expression (4). In other words, by setting the value of NA to a proper value, the number of times of calculation of the output probability can be reduced in comparison with the collating unit 104 of the voice recognition apparatus in FIG. 1, and a desirable approximate value of the output probability P(X) can be obtained by the expression (1).

(5-4) Calculation of Forward Probability

Figure 8:
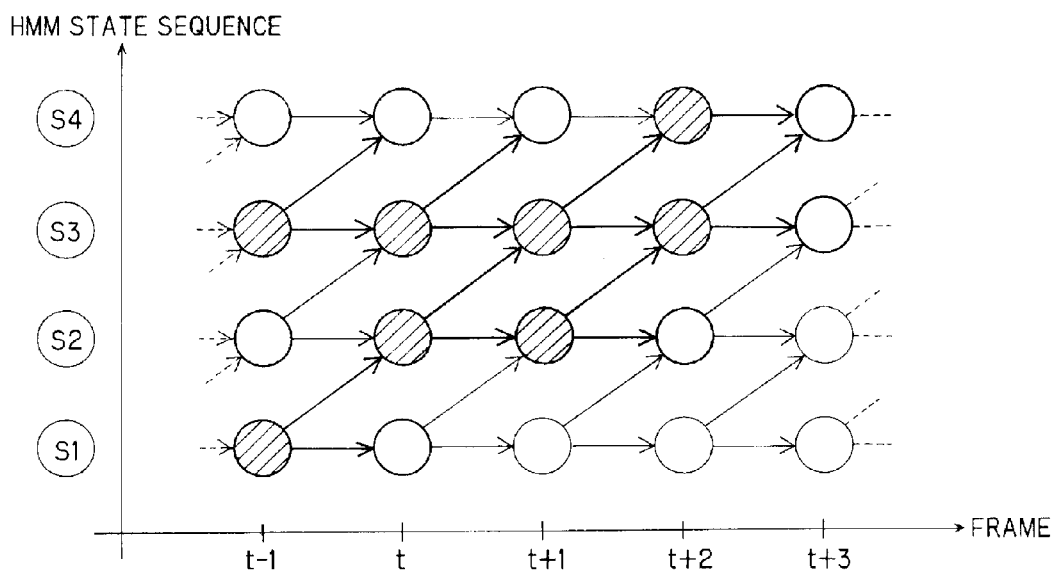
FIG. 8 is a schematic drawing of forward probability calculation in the voice recognition apparatus 2 of FIG. 7.

A schematic procedure of the calculation of the forward probabilities by the collating unit 004 in the voice recognition apparatus in FIG. 7 will be shown in FIG. 8.

FIG. 8 is in same manner as FIG. 6, showing the result of the calculation of the forward probability in the expression (4). FIG. 8 is an example in which the number of the states to be selected in the frame "t–1" is two (NA=2). In FIG. 8, the two states having the highest and the second highest forward probabilities are selected from the set of states having the significant forward probabilities in the frame "t–1"; and the selected state set is defined as the state set SA. In the frame "t", a set SB of states able to be transited from the state set SA is selected and the output probabilities are calculated only for the transition paths from SA to SB. This procedure is repeated in the frames t+1, t+2, . . . . When comparing FIG. 8 and FIG. 6, it is understood that the number of times of calculation of the output probabilities in the voice recognition apparatus in FIG. 7 is reduced in comparison with the voice recognition apparatus in FIG. 1.

In this manner, by reducing the number of times of calculation of the output probabilities on the basis of the beam search, the number of times of calculation of the output probabilities is reduced without giving an adverse effect to the performance.

(6) Method on the Basis of Standard Frame

Subsequently, a method of reducing the number of times of calculation of the output probability on the basis of the standard frame will be described.

(6-1) Configuration of Voice Recognition Apparatus

Figure 9:
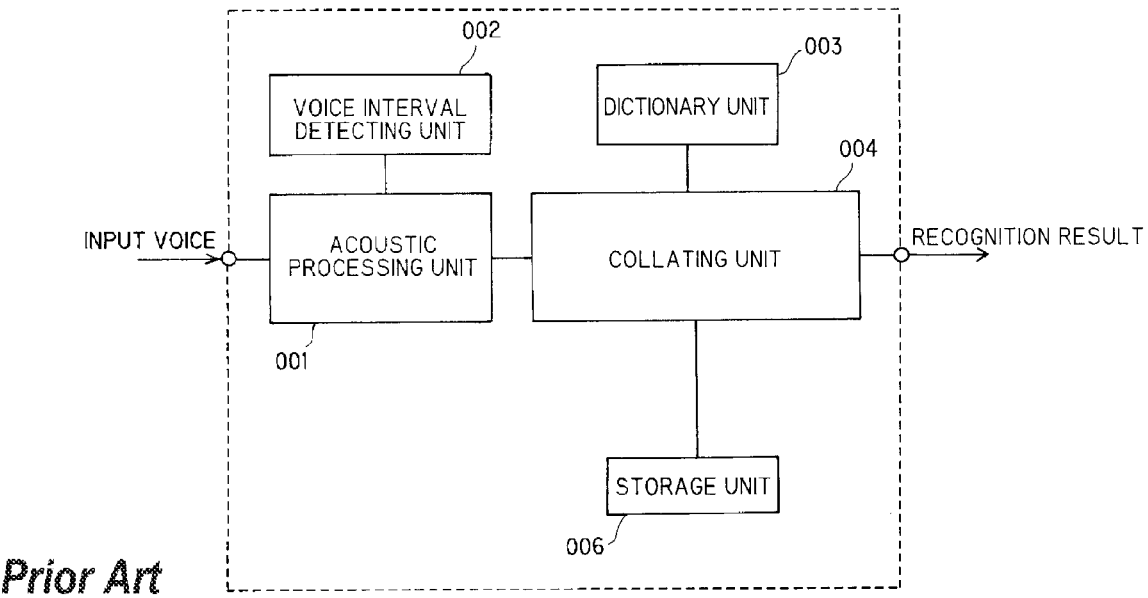
FIG. 9 is a block diagram of a still other preferable non-embodiment voice recognition apparatus 3.

FIG. 9 is a block diagram showing an example of configuration of the voice recognition apparatus preferable for this method.

The voice recognition apparatus in FIG. 9 includes the acoustic processing unit 001, the voice interval detecting unit 002, the dictionary unit 003, and the collating unit 004 as the voice recognition apparatus in FIG. 1, and further includes a storage unit 006. The voice recognition apparatus in FIG. 9 performs the same processing as the voice recognition apparatus in FIG. 1 other than that the collating unit 004 operates in conjunction with the storage unit 006.

Therefore, in the description given below, only the operation of the collating unit 004 and the storage unit 006 different from the voice recognition apparatus in FIG. 1 will be described.

(6-2) Storage Unit 006

The storage unit 006 stores a standard frame "q" ($1 \leq q \leq T$) and an output probability buffer RSji.

The standard frame "q" stores the frame ordinal number assigned to a frame in any one of the voice intervals. In the processing in the collating unit 004 described later, when the processing is made frame by frame from a certain standard frame "q" and the difference (t–q) between the current frame "t" and the standard frame "q" equals or exceeds a threshold value NQ, the current frame "t" is taken to be a new standard frame "q". In other words, when $(t-q) \geq NQ$ is satisfied, the standard frame "q" is determined to be equal to t; q=t, and hence is renewed, where the initial value of the standard frame "q" is 1.

In other words, the beginning (frame 1) of the voice interval is always used as a first standard frame. The output probability buffer RSji stores an output probability $Bji(x(q))$ in the standard frame "q" for all the combinations (j, i) where $1 \leq j, i \leq NS$, that is, $RSji = Bji(x(q))$.

When the standard frame "q" is renewed, the output probability buffer RSji is also renewed. In other words, the renewed standard frame "q" is defined again to be $RSji = Bji(x(q))$, and this procedure is repeated every time when the standard frame is renewed.

(6-3) Collating Unit 004

The collating unit 004 refers the standard frame "q" stored in the storage unit 006 when calculating the forward probability with the expression (3), and when the current frame "t" matches the standard frame "q" (that is, t=q), calculates the output probability $Bji(x(q))$ for each of the combinations (j, i) where $1 \leq j, i \leq NS$, stores the calculated output probability in the buffer RSji of the storage unit 006, and then calculates the forward probability.

When the current frame t is $q < t < q + NQ$, the collating unit 004 does not calculate the output probability $Bji(x(t))$, but calculates the forward probability using the output probability stored in the output probability buffer RSji of the storage unit 006 as an approximate value of the output probability in the frame "t". More specifically, the expression (5) and the expression (6) shown below are used instead of the expression (3).

$$\alpha(i, t) = \max_j (Aji * Bji(x(t)) * \alpha(j, t-1)) \quad (5)$$

where $t = q$ $$\alpha(i, t) = \max_j (Aji * RSji * \alpha(j, t-1)) \quad (6)$$

where $q < t < q + NQ$

The output probability Bji(x(q)) must simply be calculated only when t=q is satisfied in the expression (5) and the expression (6), and hence the number of times of calculating the output probability can be reduced in comparison with the expression (3).

Here, when the frame width with respect to a time change of the input voice is sufficiently small, the difference between the voice characteristic vectors x(q) and x(t)((t-q)<NQ) which is temporally close to each other is sufficiently small, and hence the difference between the output probabilities Bji(x(q)) and Bji(x(t)) is sufficiently small. Therefore, it is expected that Bji(x(q)), that is, RSji becomes a desirable approximate value Bji(x(t)) by setting the threshold value NQ for renewing the standard frame to an approximate value.

(6-4) Calculation of Forward Probability

Figure 10:
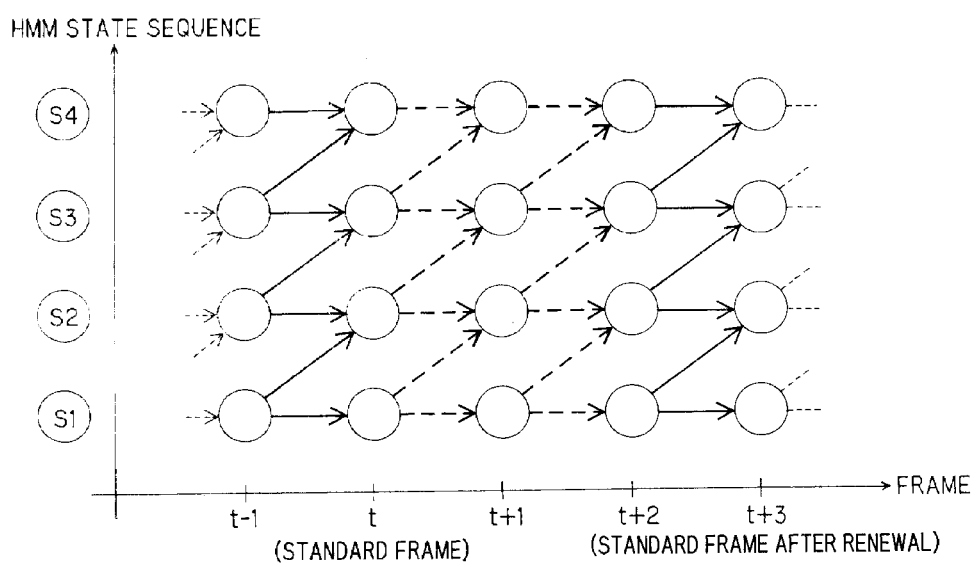
FIG. 10 is a schematic drawing illustrating the forward probability calculation in the voice recognition apparatus 3.

A schematic procedure of the calculation of the forward probabilities by the voice recognition apparatus in FIG. 9 is shown in FIG. 10.

FIG. 10 corresponds to FIG. 6, and shows a result of the calculation of the forward probability with the expression (5) and the expression (6). FIG. 10 is an example when the threshold value NQ of renewal of the standard frame is 3, in which the standard frame q=t is renewed to q=t+3 in the frame t+3.

In FIG. 10, the calculation of the output probability is performed only in the standard frame, and the output probability calculated in the standard frame is used as the approximate value in the frames following the standard frame. This procedure is repeated every time when the standard frame is renewed. When FIG. 10 is compared with FIG. 6, it is understood that the number of times of calculation of the output probability is reduced by using the voice recognition apparatus in FIG. 9 in comparison with the voice recognition apparatus in FIG. 1.

In this manner, the number of times of calculation of the output probability is reduced by reducing the number of times of calculation of the output probability on the basis of the standard frame without giving an adverse effect to the performance.

(7) Characteristics and Problems in Above Methods

The method of reducing the number of times of calculation of the output probability on the basis of the beam search and the method of reducing the number of times of calculation of the output probability on the basis of the standard frame have different characteristics from each other.

In other words, the former reduces the number of times of calculation of the output probability in a certain frame, and the latter reduces the number of times of calculation of the output probability in an interval which includes a plurality of frames. Therefore, it is supposed that the number of times of calculation of the output probability can be reduced further efficiently by using both of these methods simultaneously in comparison with the case in which these methods are used independently. However, there is a problem in using these methods simultaneously, and the number of times of calculation of the output probability cannot be reduced efficiently by simply combining these methods. The problem will be described below.

As described above, in the method on the basis of the beam search, the state set SA and the state set SB are selected for each frame, and the output probability Bji(x(t)) is calculated only for the combinations (j, i) which satisfies both Sj∈SA and Si∈SB.

On the other hand, in the method on the basis of the standard frame, the output probabilities Bji(x(q)) are calculated for all the combinations (j, i) which satisfy $1 \leq j$, $i \leq NS$ in the standard frame q, are stored in the output probability buffer RSji, and are used as an approximate value of the output probability in the frames after the standard frame on.

(8) How to Calculate when Both Methods are Used Simultaneously

When both of the method on the basis of the beam search and the method on the basis of the standard frame are used simultaneously, the method of calculating the output probability Bji(x(q)) in the standard frame q comes into question. Simply considering, there are two methods as shown below.

A first method is to calculate the output probability Bji(x(q)) for all the combinations (j, i) in the standard frame q.

A second method is to calculate the output probability Bji(x(q)) only for the combinations (j, i) which satisfies both Sj∈SA and Si∈SB in the standard frame q.

(9) A Problem of the Calculating Method which May Arise when Both of these Methods are Used Simultaneously.

(9-1) First Method

The first method is realized by combining the search target selecting unit 005 of the voice recognition apparatus in FIG. 7 to the collating unit 004 of the voice recognition apparatus in FIG. 9 and modifying part of the operation of the collating unit 004.

In other words, the collating unit 004 calculates the output probabilities Bji(x(q)) for all the combinations (j, i) where $1 \leq j$, $i \leq NS$ in the standard frame q, and stores the results in the output probability buffer RSji. In the frame "t" (q<t≤q+ NQ) other than the standard frame, the state set SA and the state set SB are selected on the basis of the beam search, and the output probability Bji(x(t)) is not calculated for the combinations (j, i) which satisfy both Sj∈SA and Si∈SB, but the approximate value RSji of the output probability is used.

Figure 11:
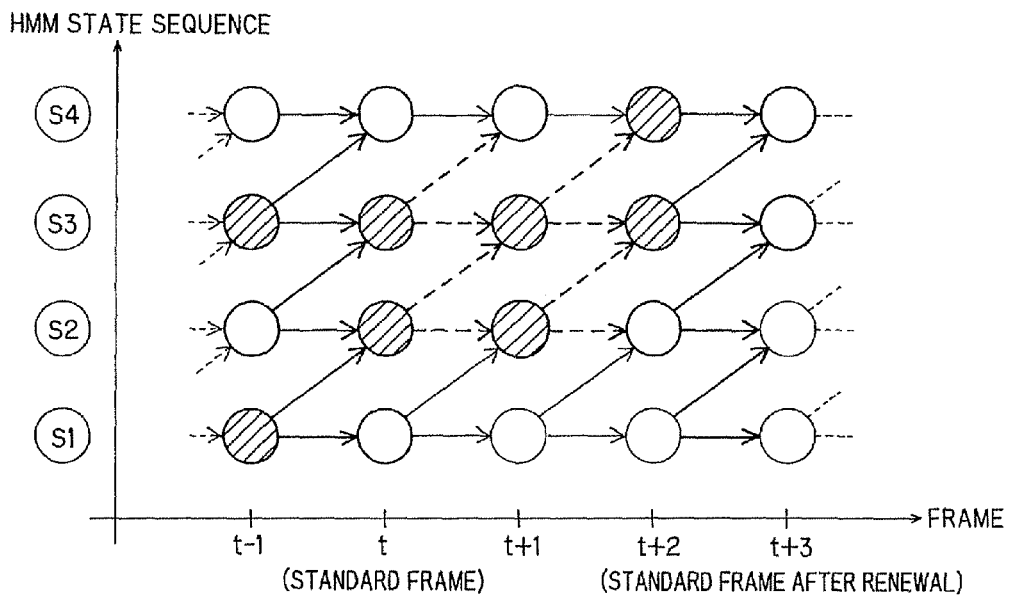
FIGS. 11-12 are schematic drawings illustrating the forward probability calculation for explaining problems in the non-embodiment apparatuses and methods.

A schematic procedure of the calculation of the forward probability in the collating unit 004 in which the operation is partly modified will be shown in FIG. 11. FIG. 11 corresponds to FIG. 10, in which the selection of the state set on the basis of the beam search is performed by modifying the operation as described above. In this case, however, the number of times of calculation of the output probability is the same as the cases where the method on the basis of the standard frame is used independently (FIG. 10) and where the method on the basis of the beam search is simultaneously used therewith (FIG. 11). It is because that, in both cases, the calculation of the output probability is executed only in the standard frame "q" and; in the standard frame "q", the output probabilities are calculated for all the combinations (j, i) where $1 \leq j$, $i \leq NS$. Therefore, in this method, the number of times of calculation of the output probability cannot be reduced further efficiently.

(9-2) Second Method

The second method can be realized by combining the storage unit 006 in FIG. 9 with the collating unit 004 of the voice recognition apparatus in FIG. 7 and modifying part of the operation of the collating unit 004.

In other words, the collating unit 004 selects the state set SA and the state set SB on the basis of the beam search, calculates the output probability $Bji(x(q))$ only for the combinations (j, i) which satisfy both $Sj \in SA$ and $Si \in SB$, and stores the results in the output probability buffer RSji in the standard frame q. In the frame t ($q<t<q+NQ$) other than the standard frame, the state set SA and the state set SB are selected, and the value stored in the output probability buffer RSji is used as an approximate value of the output probability $Bji(x(t))$ for the combinations (j, i) which satisfies both $Sj \in SA$ and $Si \in SB$. Since the states included in the state set SA and the state set SB are different from frame to frame, however, there may be a case in which the approximate value $RSji=Bji(x(q))$ of the output probability $Bji(x(t))$ used for the calculation of the forward probability in the frame t is not calculated in the standard frame q. In such a case, the calculation of the forward probability in the frame t cannot be continued. Therefore, by ignoring the transition paths in which the approximate value RSji of the output probability cannot be used, the number of the transition paths used for calculating the forward probability is smaller in comparison with the set of the transition paths from the state set SA to the state set SB selected on the basis of the beam search.

Figure 12:
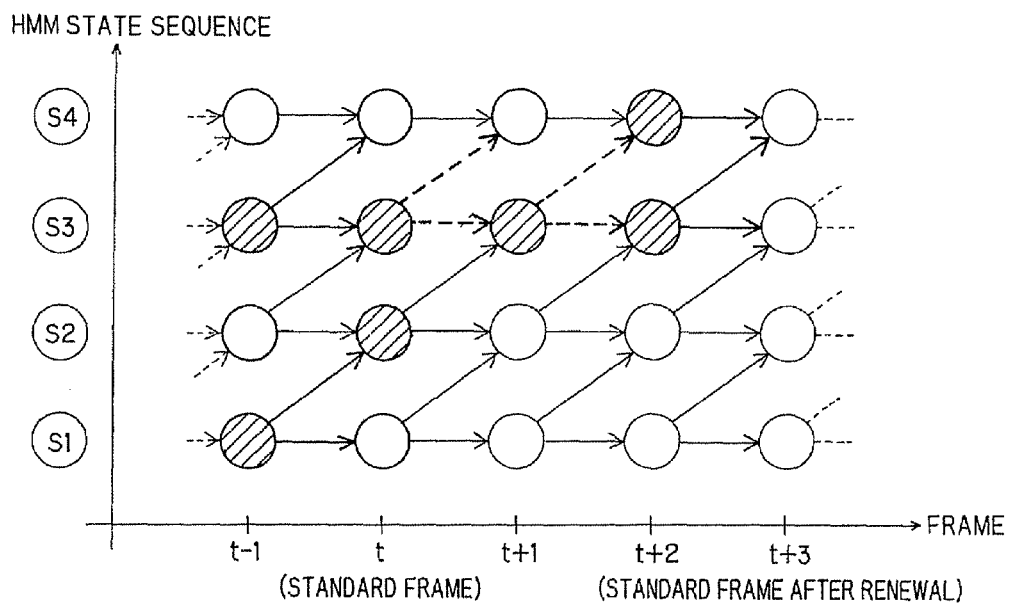

A schematic procedure of the calculation of the forward probability in the collating unit 004 in which the operation is partly modified in this manner is shown in FIG. 12. FIG. 12 corresponds to FIG. 8, in which the calculation of the output probability on the basis of the standard frame and the usage of the approximate value are performed with the modification of the operation described above. In FIG. 12, the output probability is calculated only in the standard frame, and hence the number of times of calculation of the output probability is reduced in comparison with FIG. 8.

However, the state sets selected for each frame are significantly different between FIG. 12 and FIG. 8. In FIG. 12, since there are transition paths for which the approximate value of the output probability cannot be used, the number of the states having the forward probability significant in the forward calculation in a certain frame is smaller than in FIG. 8. This means that it is highly likely that the transition paths which provide the maximum value of $\alpha(1, T)$ cannot be used in the calculation of the forward probability $\alpha(1, T)$ with the expression (1). In other words, the desirable approximate value of the output probability $P(X)$ cannot be obtained with the expression (3), and hence it may give an adverse effect to the performance of the voice recognition apparatus. Therefore, the number of times of calculation of the output probability cannot be reduced further efficiently with this method as well.

First Embodiment

A voice recognition apparatus according to a first embodiment includes an acoustic processing unit, a voice interval detecting unit, a dictionary unit, a collating unit, a search target selecting unit, a storage unit and a determining unit. Functions of the respective units are realized by a program stored in a computer.

On the basis of the description of the related art shown above, the calculation of the forward probability in the voice recognition apparatus according to this embodiment will be described.

Firstly, in respect of the standard frame "q", the search target selecting unit selects the state set SA and the state set SB, and calculates the output probability $Bji(x(t))$ only for the combinations (j, i) which satisfy both $Sj \in SA$ and $Si \in SB$, and the storage unit stores the result in the output probability buffer RSji. Now, the determining unit stores information about the transition paths whose approximate values RSji of the output probabilities are not stored in respect of the standard frame "q".

In respect of the frames "t" ($q<t<q+NQ$) other than the standard frame, the search target selecting unit selects the state set SA and the state set SB. At this time, the determining unit determines whether the approximate value RSji of the output probability which may be used for the transition paths corresponding to the combinations (j, i) which satisfies both $Sj \in SA$ and $Si \in SB$ exists or not.

The collating unit refers the result of determination, and does not calculate the output probability $Bji(x(t))$ for the transition paths having the approximate value RSji, and uses the approximate value RSji stored in the storage unit.

For the transition paths which do not have the approximate value RSji, the output probability $Bji(x(t))$ of the current frame "t" is calculated, and the result is stored additionally in the output probability buffer RSji and is used as the approximate value in the subsequent frames. Accordingly, the following effects are achieved.

Firstly, by selecting the state sets on the basis of the beam search, the number of the transition paths referred in the calculation of the forward probability in each frame is reduced. In other words, the number of the transition paths which need to refer the output probability is reduced.

Then, by storing the output probability calculated in the standard frame and employing the output probability calculated in the standard frame as the approximate value for the subsequent frames, the number of times of calculation of the output probability is reduced.

Furthermore, when the approximate value cannot be used in a frame after the standard frame, the output probability for the current frame is calculated and stored to use as the approximate value of the output probability in the subsequent frames.

In other words, the number of times of calculation of the output probability for each transition path is only once for an interval from the current standard frame to (to just before) the frame where the standard frame is renewed.

Figure 13:
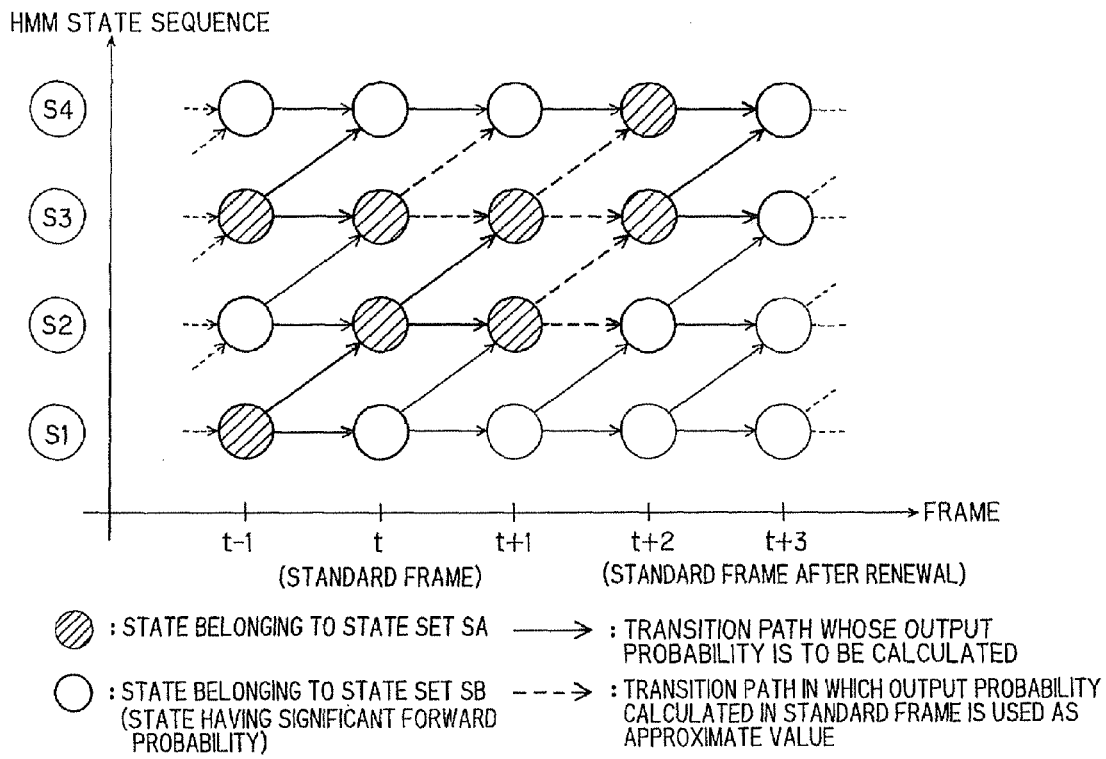
FIG. 13 is a schematic drawing illustrating the forward probability calculation for explaining embodiments of the present invention.

Consequently, the number of the transition paths which require reference of the output probability is reduced in the calculation of the forward probability by the collating unit; and, in addition, the number of times of calculation of the output probability for all transition paths, for a sequence of frames from a certain standard frame through a frame just before the frame where the standard frame is renewed is once; and hence the number of times of calculation of the output probability can be reduced significantly. A schematic procedure of calculation of the forward probability will be shown in FIG. 13. FIG. 13 corresponds to FIG. 8 and FIG. 10.

When FIG. 13 is compared with FIG. 8, in FIG. 13, the state set is selected as in FIG. 8, and furthermore, the output probability is calculated only once for each transition path, for a sequence of frames from the current standard frame "t" to the frame just before the next standard frame "t+3" after renewal, whereby the total number of times of calculation of the output probability is reduced in comparison with FIG. 8. At this time, the number of states having the significant forward probability in each frame is the same as that in FIG. 8, and hence they are expected to be the desirable approximate values in the output probability $P(X)$ in the expression (3).

When the FIG. 13 is compared with FIG. 10, in FIG. 13, the standard frame is set and renewed as in FIG. 10, and furthermore, the selection of the state set, and the calculation and the storage of the output probability and the usage of the same as the approximate value in the frames in the range from the standard frame "t" to the frame just before the standard frame "t+3" after renewal, so that the total number of times of calculation of the output probability can be reduced in comparison with FIG. 10. The approximate accuracy of the output probability depends on the threshold value NQ for renewing the standard frame, and hence the threshold value NQ which provides a preferable approximate accuracy in FIG. 10 is expected to be a desirable approximate value also in FIG. 13.

Detailed Description of the First Embodiment

Referring now to FIG. 14 to FIG. 18, the voice recognition apparatus according to the first embodiment will be described in detail.

(1) Configuration of Voice Recognition Apparatus

Figure 14:
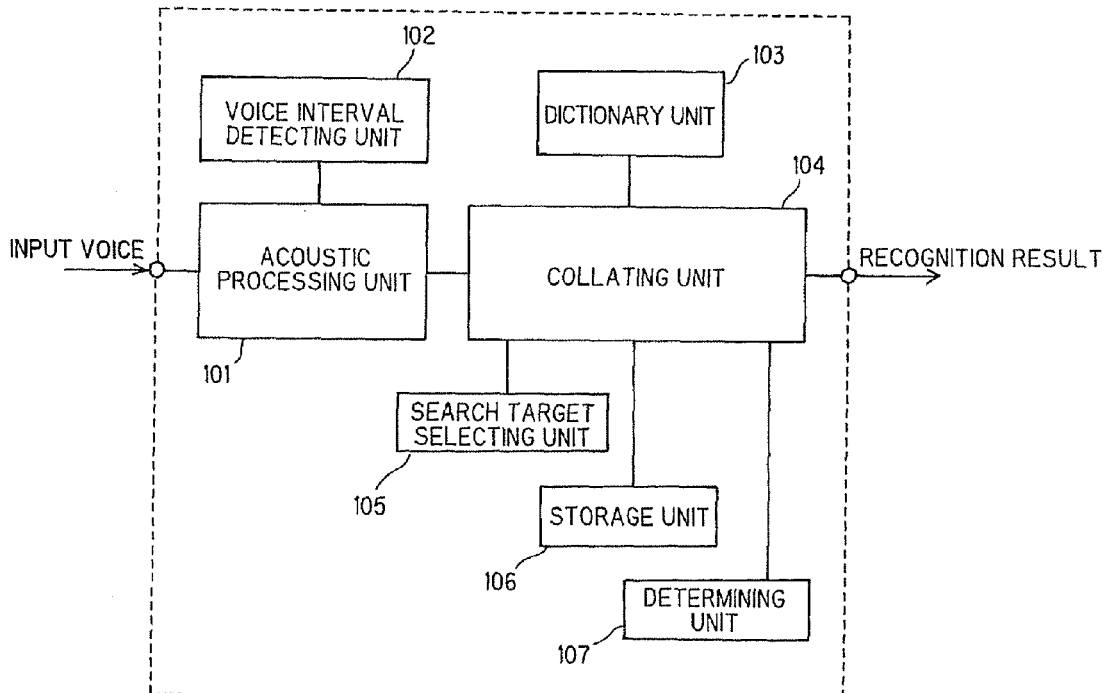
FIG. 14 is a block diagram of the voice recognition apparatus according to a first embodiment of the present invention.

FIG. 14 is a block diagram showing an example of the configuration of the voice recognition apparatus according to the first embodiment.

The voice recognition apparatus shown in FIG. 14 includes an acoustic processing unit 101, a voice interval detecting unit 102, a dictionary unit 103, a collating unit 104, a search target electing unit 105, a storage unit 106, and a determining unit 107. Functions of the respective units 101 to 107 can be realized by a program stored in the computer.

(1-1) Acoustic Processing Unit 101

The acoustic processing unit 101 generates a time sequence of a voice characteristic vector $X=(x(1), x(2), \ldots, x(T))$ from an input voice signal for each frame of a certain time width.

Here, $x(t)$ is a voice characteristic vector in the frame "t", where $1 \leq t \leq T$, and $t=1$ corresponds to the beginning of the voice detected by the voice interval detecting unit 102 described later, and $t=T$ corresponds to the end of the voice. The voice characteristic vector $x(t)$ is a vector having plural elements or higher than one dimension, and expresses the voice characteristics in the frame "t". As the voice characteristic vector as described above, there is "MFCC" described in Takubo et al mentioned in "BACKGROUND OF THE INVENTION". The MFCC is a method to obtain the voice characteristic vector by taking a value of logarithm of Mel filter bank output with respect to the voice spectrum in the frame "t", and then performing Cepstrum analysis for extracting the lower order components by applying DCT.

(1-2) Voice Interval Detecting Unit 102

The voice interval detecting unit 102 detects the voice interval (the beginning and the end of the voice) from the input voice signal.

As a method of detecting the voice interval, there is a method of calculating the ratio of the power of the input voice with respect to an estimated noise power estimated in the noise interval, for each frame, and detecting the temporally consecutive frames whose ratio exceeds a certain threshold value as the voice interval. In this case, the first frame whose ratio described above exceeds the threshold value is detected as the beginning of the voice interval, the temporally consecutive frames whose ratio described above exceeds the threshold value is detected as frames within the voice interval, and a frame immediately before the frame whose ratio described above under runs the threshold value is detected as the end of the voice interval.

(1-3) Dictionary Unit 103

The dictionary unit 103 stores a plurality of the HMMs assigned to different categories.

The HMM is defined by: one or more states Si ($i=1, 2, \ldots, NS$); a set SS of the initial state and a set SF of the final state; a transition probability Aji from a certain state Sj to a certain state Si; a probability density function Bji( ) that provides the output probability Bji(x) of the voice characteristic vector x in the transition path from the certain state Sj to the certain state Si; and an initial probability Pi ($i=1, 2, \ldots, NS$) of the respective one of the states Si; where $1 \leq i, j \leq NS$, and NS designates a total number of the states which constitute the HMM. When a contaminated normal distribution is used as the probability density function Bji( ), the output probability Bji(x) is calculated with the expression (7).

$$Bji(x) = \sum_m Wjim * Gjim(x) \qquad (7)$$

where Wjim designates a branch probability to $m^{th}$ multi-dimensional normal distribution which constitutes the probability density function Bji( ), Gjim( ) designates $m^{th}$ multi-dimensional normal distribution which constitutes the probability density function Bji( ), and Gjim( ) designates a multi-dimensional normal distribution which is defined by the expression (8).

$$Gjim( ) = N(\mu jim, \Sigma jim^2) \qquad (8)$$

where $\mu jim$ designates an average vector of the multi-dimensional normal distribution Gjim( ), $\Sigma jim$ is a covariance matrix of the multi-dimensional normal distribution Gjim( ), $1 \leq m \leq M$, and M designates a mixed number of the probability density function Bji( ).

Figure 17:
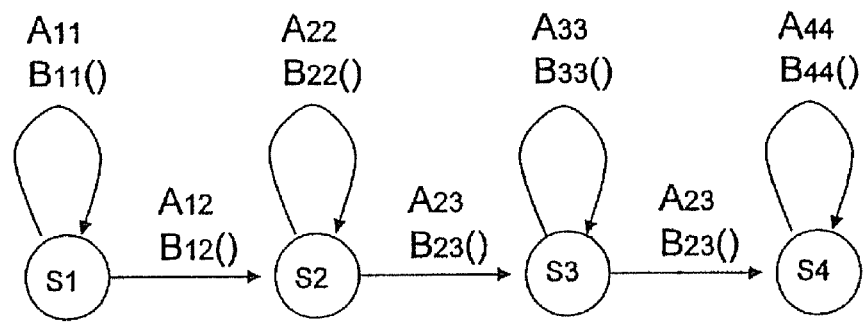
FIG. 17 is an example of an HMM according to an embodiment of the invention.

An example of the HMM is shown in FIG. 17. FIG. 17 illustrates an example of the HMM whose number of state is four (NS=4).

Description of the transition paths whose transition probabilities and output probabilities are not significant is omitted. That is, description of the transition paths whose transition and output probabilities are always 0 is omitted. The set of the initial states is S1, or SS={S1}; and the set of the final states is S4, or SF={S4}. The HMM in FIG. 17 is an example of the HMM which is typically used in the voice recognition, has a structure referred to as left-to-right type, has one element each in the set of the initial states and the set of the final states, and has the transition probability Aji and the output probability Bji(x) significant only for the combinations (j, i) where i=j or I=j+1. Description assuming the HMM in FIG. 17 will be continued below. However, the dictionary unit 103 may store any HMM including the example in FIG. 17. For example it may store the HMM having a number of transition paths as in FIG. 18.

(1-4) Collating Unit 104

The collating unit 104 performs collation between the HMM and the voice characteristic vector sequence.

In other words, the output probability P(X|c) from the HMM assigned to a certain category "c" is calculated for the voice characteristic vector sequence $X=(x(1), x(2), \ldots, x(T))$ generated from the beginning to the end of the voice interval. The collating unit 104 calculates the output probabilities P(X|c) where $1 \leq c \leq C$, from the HMMs assigned to the categories, for the respective categories and outputs the category assigned to the HMM which provide the largest output probability as the recognition result. When expressing the output probability P(X|c) from the HMM assigned to a certain category "c" simply as P(X), P(X) is obtained normally with the expression (9), the expression (10) and the expression (11).

$$P(X) = \max_i \alpha(i, T) \quad (9)$$
where $Si \in SF$ $$\alpha(i, 0) = Pi \quad (10)$$
where $Si \in SS$ $$\alpha(i, t) = \max_j (Aji * Bji(x(t)) * \alpha(j, t-1)) \quad (11)$$
for all $j$ where $\alpha(i, t)$ is a forward probability of the HMM, which transits from the initial state and reach the state Si in frame "t".

Since the HMM includes a plurality of transition paths starting from the initial state and reaching the state Si at the frame "t", the forward probability corresponds to a summation of the forward probabilities of the plurality of transition paths. However, in the expression (11), only one transition path which provides the largest forward probability is selected out of the plurality of transition paths, and the selected forward probability is used. This method is referred to as "Viterbi method".

Viterbi method is known in the field of the voice recognition as a good approach to the method of finding a summation of forward probabilities of the plurality of transition paths. In the calculation of the forward probability by the collating unit 104 in this embodiment, the number of times of calculation of the output probability Bji(x(t)) with the expression (11) is reduced efficiently without giving an adverse effect to the voice recognition performance by combining with the processing of the search target selecting unit 105, the storage unit 106, and the determining unit 107 described later. This point will be described later.

(1-5) Search Target Selecting Unit 105

The search target selecting unit 105 performs the beam search for each frame, and selects the state set SA of the HMM and the state set SB of the HMM which can be transited from the state set SA.

The state set SA in a certain frame "t" is a set of NA states from the top having larger forward probabilities than others out of the states Sj in which the significant forward probability $\alpha(j, t-1)$ which is not zero in frame "t-1" is not zero, where $1 \leq NA < NS$. When the total number of all the states Sj in which $\alpha(j, t-1)$ is not zero are smaller than NA, all the states Sj in which $\alpha(j, t-1)$ is not zero are selected and defined to be the state set SA. The state set SB in a certain frame "t" is a set of all the states Si which can be transited from all the states Sj where $Sj \in SA$.

(1-6) Storage Unit 106

The storage unit 006 stores a standard frame "q" ($1 \leq q \leq T$) and an output probability buffer RSji.

The standard frame "q" stores the frame number of any one of the voice intervals. In the processing in the collating unit 104, when the processing is made frame by frame from a certain standard frame "q" and the difference (t−q) between the current frame "t" and the standard frame "q" equals or exceeds the threshold value NQ, the current frame "t" is taken to be a new standard frame "q". In other words, when (t−q)≧NQ is satisfied, the standard frame q is determined to be equal to t; q=t, and hence is renewed, where the initial value of the standard frame "q" is 1. In other words, the beginning (frame 1) of the voice interval is always used as the first standard frame. The output probability buffer RSji stores the result of calculation of the output probability Bji(x(t)) in a certain frame t. In other words, RSji=Bji(x(t)) is established. When the standard frame q is renewed, the result of calculation of the output probability stored in the output probability buffer RSji is deleted.

(1-7) Determining Unit 107

The determining unit 107 stores a flag FSji. The respective elements of the flag FSji is either one of two values [0, 1] and, when the output probability Bji(x(t)) is stored in the output probability buffer RSji in the storage unit 106, is set to 1, and if not, is set to 0.

In other words, by referring the flag FSji, whether or not the output probability is stored in the output probability buffer RSji of the storage unit 106 can be determined. When the standard frame q stored in the storage unit 106 takes the initial value 1, or when the standard frame q is renewed, all the elements of the flag FSji is initialized to 0.

(2) Calculation of Output Probability P(X).

Referring now to flowcharts in FIG. 15 and FIG. 16, a flow of processing for calculating the output probability P(X) of the voice characteristic vector sequence X of the HMM assigned to a certain category in the voice recognition apparatus shown in FIG. 14 will be described.

Firstly, a processing in the flowchart in FIG. 15 will be described in detail below. The flowchart shows a procedure to calculate the forward probabilities $\alpha(i, t)$ in the respective frames, and a procedure to obtain the output probability P(X) of the voice characteristic vector sequence X in the frame t.

In Step P101, the collating unit 104 initializes the frame number t to 1.

In Step P102, the storage unit 106 initializes the standard frame number q to 1.

In Step P103, the determining unit 107 initializes the flag FSji to 0 for all the combinations (j, i) where $1 \leq j, i \leq NS$.

In step P104, the collating unit 104 calculates the forward probability $\alpha(i, t)$ in the current frame t=1 according to the procedure in Step P120. In other words, the forward probability in the frame 1 is obtained. Step P120 will be described later in detail.

In Step P105, the collating unit 104 increments the frame number t by 1. In other words, the procedure goes to the processing of the next frame with t=t+1.

In Step P106, the collating unit 104 compares the frame number t of the current frame with the frame number T which indicates the end of the voice. When t≦T, that is, when the frame t is a frame within the voice interval, the procedure goes to Step P107 to Step P111 to obtain the forward probability of the current frame t. When t>T, that is, when the processing for all the frames within the voice interval is completed, the output probability P(X) of the voice characteristic vector sequence X is obtained in Step P112.

In Step P107, the storage unit 106 compares the difference between the current frame number t and the standard frame number q with the threshold value NQ, and determines whether the standard frame q is to be renewed or not. When the number of passed frames from the standard frame q to the current frame t is equal to or larger than NQ, that is, when (t−q)≧NQ is satisfied, the procedure goes to Step P109 to Step P111 to renew the standard frame q, and then obtains the forward probability of the current frame t. When (t−q)<NQ, the procedure goes to Step P108, where the standard frame q is not renewed, and the forward probability of the current frame t is obtained.

In Step P108, the collating unit 104 calculates the forward probability $\alpha(i, t)$ in the current frame t in the procedure of Step P120. In other words, the collating unit 104 does not renew the standard frame q and obtains the forward probability of the current frame t. Step P120 will be described later in detail.

In Step P109, the storage unit 106 renews the standard frame q in the current frame t, that is, q=t.

In Step P110, the determining unit 107 initializes the flag FSji to 0 for all the combinations (j, i) where 1≦j, i≦NS.

In Step P111, the collating unit 104 calculates the forward probability α(i, t) in the current frame t in the procedure of Step P120. In other words, the collating unit 104 renews the standard frame q and then obtains the forward probability of the current frame t. Step P120 will be described later in detail.

In Step P112, the largest forward probability in the state Si where Si∈SF in the frame T is obtained with the expression (9). In other words, in Step P112, the calculation of the output probability P(X) of the voice characteristic vector sequence X in the HMM which is assigned to a certain category is ended.

(3) Calculation of Forward Probability α(i, t)

Subsequently, the processing of the flowchart in FIG. 16 will be described in detail below.

This flowchart illustrates calculation of the forward probabilities α(i, t) in the respective frames in detail.

In Step P121, the search target selecting unit 105 refers the forward probability α(j, t−1) which is already calculated in the frame t−1, and selects the NA states from the top having the larger forward probabilities than others out of all the states Sj where α(j, t−1) is not 0 as the state set SA. However, when the number of the states Sj where α(j, t−1) is not zero is smaller than NA, all the states Sj where α(j, t−1) is not 0 are selected as the state set SA. The forward probability α(j, 0) where t=1 is obtained with the expression (10).

In Step P122, the search target selecting unit 105 selects all the states which can be transited by the transition paths where Aji is not 0 from all the states Sj where Sj∈SA as the state set SB.

In Step P123, Step P124 to Step P128 described below are executed for all the combinations (j, i) which satisfy both Sj∈SA and Si∈SB. When the processing for all the combinations (j, i) is completed, the procedure goes to Step P129.

In Step P124, the determining unit 107 refers the flag FSji and, when FSji=1 is satisfied, that is, when the output probability is stored in the output probability buffer RSji of the storage unit 106, the procedure goes to Step P128. When FSji=1 is not satisfied, that is, when the calculated output probability is not stored in the output probability buffer RSji, the procedure goes to Step P125 to Step P127, where the output probability is calculated and stored.

In Step P125, the collating unit 104 calculates the output probability Bji(x(t)) of the voice characteristic vector x(t) in the current frame t with the expression (7) and the expression (8).

In Step P126, the storage unit 106 stores the output probability Bji(x(t)) calculated in Step P125 in the output probability buffer RSji. In other words, RSji=Bji(x(t)) is established.

In Step P127, the determining unit 107 sets a numerical value 1 which indicates that the result of calculation of the output probability is stored in the output probability buffer RSji of the storage unit 106 to the flag FSji. In other words, FSji=1 is established.

In Step P128, the collating unit 104 approximates the output probability Bji(x(t)) of the voice characteristic vector x(t) in the current frame t with the output probability stored in the output probability buffer RSji of the storage unit 106. In other words, the Bji(x(t))=RSji is established.

In Step P129, the forward probability α(i, t) in the current frame t is calculated on the basis of the output probability calculated in Step P125 described above and the approximate value of the output probability obtained in Step P128 described above. When considering Step P124 to Step P129, the expressions for calculating the forward probability α(i, t) are the following expressions (12), (13) and (14) shown below. These three expressions are for the replacement of the expression (11) in the voice recognizing method in the related art.

For (j, i) which satisfies all of FSji=0 and {j:Sj∈SA} and {i:Si∈SB}, $$\alpha 1(i, t) = \max_j(Aji * Bji(x(t)) * \alpha(j, t-1)) \qquad (12)$$

For (j, i) which satisfies all of FSji=1 and {j:Sj∈SA} and {i:Si∈SB}, $$\alpha 2(i, t) = \max_j(Aji * RSji * \alpha(j, t-1)) \qquad (13)$$

$$\alpha(i, t) = \max(\alpha 1(i, t), \alpha 2(i, t)) \qquad (14)$$

In the expression (12), the expression (13) and the expression (14), the output probability Bji(x(t)) is calculated only for the combinations (j, i) which satisfy all of FSji=0, {j:Sj∈SA} and {i:Si∈SB}, and hence the number of times of calculation of the output probability Bji(x(t)) may be significantly reduced in comparison with the expression (11).

At this time, since the forward probabilities α(i, t) of the current frame t is calculated for NA forward probabilities from the top larger than others, out of the forward probabilities in the frame t−1, it is expected that the forward probabilities α(i, t) in the frame t are of the higher level when the NA being set to an adequate value.

In other words, thus obtained ones are expected to be a desirable approximation for those obtained by calculating all the forward probabilities α(j, t−1) (1≦j≦NS) in the frame t−1.

When the frame width with respect to the time change of the input voice is sufficiently small, the difference between voice characteristic vectors which are temporally close to each other is also small; and hence it is expected that the difference between the output probability Bji(x(t')) and the output probability Bji(x(t)) becomes sufficiently small by setting NQ to an adequate value for q, t, t' which satisfies both (t−q)<NQ and q≦t'<t. In other words, it is expected that the RSji=Bji(x(t')) becomes a desirable approximate value of the Bji(x(t)).

(4) Effects

In the voice recognition apparatus described in the first embodiment, the number of times of calculation of the output probability is significantly reduced in comparison with the calculation of the forward probability with the expression (11) in the Non-embodiment method and the desirable approximate value of the expression (11) may be obtained by calculating the forward probability on the basis of the expression (12), the expression (13) and the expression (14). Consequently, in the voice recognition processing, the number of times of calculation of the output probability is reduced efficiently without giving an adverse effect to the recognition performance. This is very effective for reducing the calculation cost of the voice recognition processing efficiently.

(5) Modification

The present invention is not limited to the embodiment shown above, and may be modified variously without departing the scope of the invention.

(5-1) Modification 1

In the first embodiment, the MFCC is used as the voice characteristic vector in the acoustic processing unit 101.

However, this embodiment is not limited to a specific voice characteristic vector, but may be implemented for arbitrary voice characteristic vectors such as LPC or PLP.

(5-2) Modification 2

In the first embodiment, adopted is the method on the basis of the ratio between the estimated noise power and the input voice power as a method of detecting the voice interval in the voice interval detecting unit 102.

However, this embodiment is not limited to a specific voice interval detecting method, and may be implemented for arbitrary voice interval detecting methods such as a method on the basis of the likelihood ratio between the estimated noise interval and the estimated voice interval.

(5-3) Modification 3

Figure 18:
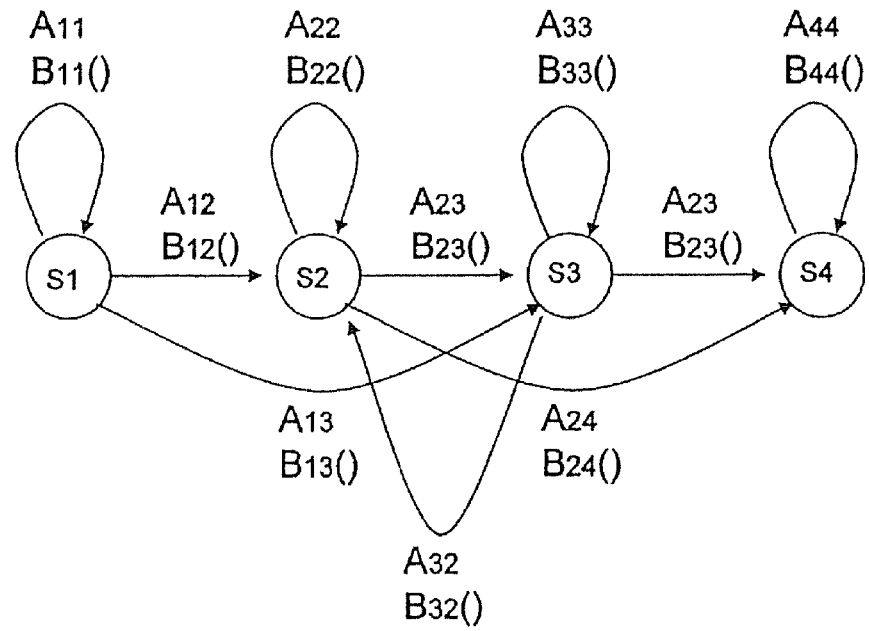
FIG. 18 is another example of the HMM.

In the first embodiment, the HMM having the structure shown in FIG. 17 and FIG. 18 is used in the dictionary unit 103.

However, this embodiment is not limited to the HMM having a specific structure, and may be implemented for the HMMs having arbitrary structures such as the HMM having an ergodic structure.

(5-4) Modification 4

In the first embodiment, a weighted summation of the output probability of the contaminated normal distribution as shown in the expression (7) as the output probability Bji(x) is used in the dictionary unit 103.

However, a method of selecting the largest output probability from the plurality of normal distribution and using the selected output probability as the output probability Bji(x) is also applicable.

(5-5) Modification 5

In the first embodiment, an expression for calculating the forward probability on the basis of Viterbi method is used in the collating unit 104.

However, the embodiment is not limited to a specific expression for calculating the forward probability, and may be implemented for arbitrary expression for calculating the forward probability, such as Trellis method.

(5-6) Modifications 6

In the first embodiment, a method of selecting the state having NA forward probabilities from the top as a method of beam search is used in the search target selecting unit 105.

However, the invention is not limited to a specific state selecting method, and may be implemented for arbitrary state selecting methods.

(5-7) Modifications 7

In the first embodiment, the fixed threshold value NQ is used for determining the threshold value of the past number of the frames from the standard frame to the current frame in the storage unit 106.

However, the invention is not limited to a specific method of renewing the standard frame, and may be implemented of arbitrary method of renewing the standard frame.

Second Embodiment

Referring now to FIG. 19 to FIG. 22, the voice recognition apparatus according to a second embodiment will be described.

(1) Configuration of Voice Recognition Apparatus

Figure 19:
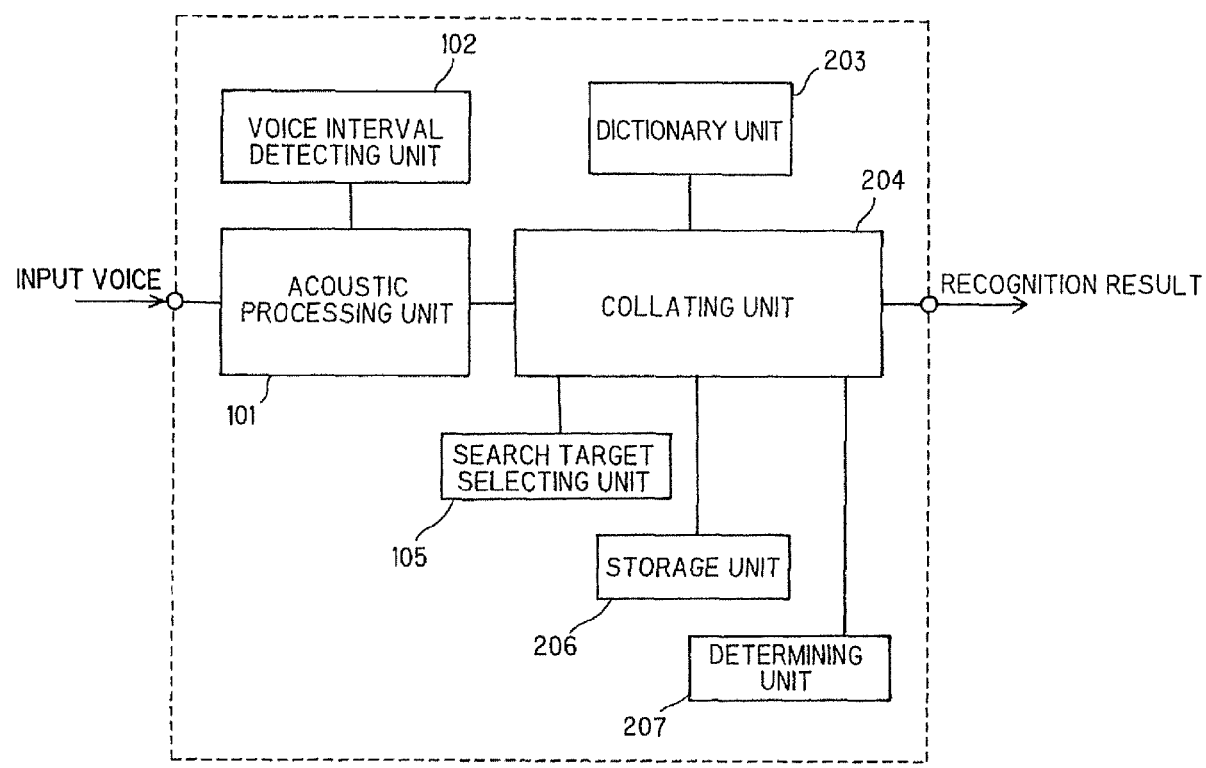
FIG. 19 is a block diagram of a voice recognition apparatus according to a second embodiment of the present invention.

FIG. 19 is a block diagram showing an example of configuration of the voice recognition apparatus according to the second embodiment.

The voice recognition apparatus shown in FIG. 19 includes the acoustic processing unit 101, the voice interval detecting unit 102, the dictionary unit 203, a collating unit 204, the search target electing unit 105, a storage unit 206 and a determining unit 207.

The acoustic processing unit 101, the voice interval detecting unit 102, the search target selecting unit 105 having the same reference numerals as those in FIG. 14 according to the first embodiment are operated in the same manner as those in the first embodiment, and hence description will be omitted here.

(1-1) Dictionary Unit 203

The dictionary unit 203 stores a plurality of HMMs assigned to different categories as the dictionary unit 103 in the first embodiment.

A different point from the dictionary unit 103 is a structure in which a certain normal distribution is commonly used by a plurality of probability density functions when using the contaminated normal distribution as the probability density function Bji( ).

The dictionary unit 203 includes a table TNjim that holds indexes to the normal distribution in which the $m^{th}$ multi-dimensional normal distribution Gjim( ) of the probability density function Bji( ) constitutes the HMM in addition to the dictionary unit 103, and the multi-dimensional normal distribution Gjim( ) is defined with the expression (15).

$$Gjim(\ )=N(\mu n, \Sigma n^2) \text{ where } n=TNjim \qquad (15)$$

where $\mu n$ designates an average vector of the $n^{th}$ multi-dimensional normal distribution of the HMM, and $\Sigma n$ designates a covariance matrix of the $n^{th}$ multi-dimensional normal distribution of the HMM.

$1 \leq n \leq NM$ is satisfied, and NN designates the number of unique normal distribution possessed by the HMM. In addition, when j1 is not equal to j2 and simultaneously, i1 is not equal to i2, n=TNj1i1m=TNj2i2m2 may be satisfied for (j1, i1, m1) and (j2, i2, m2) In such a case, the normal distribution N($\mu n$, $\Sigma n$) is commonly used by the two probability density functions Bj1i1( ) and Bj2i2( ).

(1-2) Collating Unit 204

The collating unit 204 performs collation between the HMM and the voice characteristic vector sequence in the same manner as the collating unit 104 in the first embodiment. However, the collating unit 204 performs an operation which is partly different from the collating unit 104 according to the operation of the dictionary unit 204 described above, the storage unit 206, and the determining unit 207 described later. This point will be described later.

(1-3) Storage Unit 206

The storage unit 206 stores the output probability buffer RNn(1≦n=NN) of the normal distribution in addition to the storage unit 106 in the first embodiment.

In the processing of the collating unit 204, when the output probability N($\mu n$, $\Sigma n$) of the $n^{th}$ normal distribution is calculated on the basis of the expression (7) and the expression (15) in the calculation of the output probability Bji(x(t)) in a certain frame t, the storage unit 206 stores the result of calculation. In other words, RNn=N(μn, Σn) is established.

(1-4) Determining Unit 207

The determining unit 207 stores a flag FNn in addition to the determining unit 107 in the first embodiment. Each element of the flag FNn takes one of two values [0, 1] and, is set to 1 when the output probability N(μn, Σn) of the normal distribution is stored in the output probability buffer RNn of the normal distribution in the storage unit 206 and is set to 0 if not.

In other words, by referring to the flag FNn, whether or not the output probability of the normal distribution is stored in the output probability buffer RNn of the normal distribution of the storage unit 206 can be determined. When the standard frame q stored in the storage unit 206 takes the initial value 1, or when the standard frame q is renewed, all the elements of the flag FNn is set to 0.

(2) Calculation of Output Probability P(X)

Referring now to flowcharts in FIG. 20, FIG. 21 and FIG. 22, a flow of the processing for calculating the output probability P(X) of the voice characteristic vector sequence X in the HMM assigned to a certain category in the voice recognition apparatus in FIG. 19 will be described.

Figure 15:
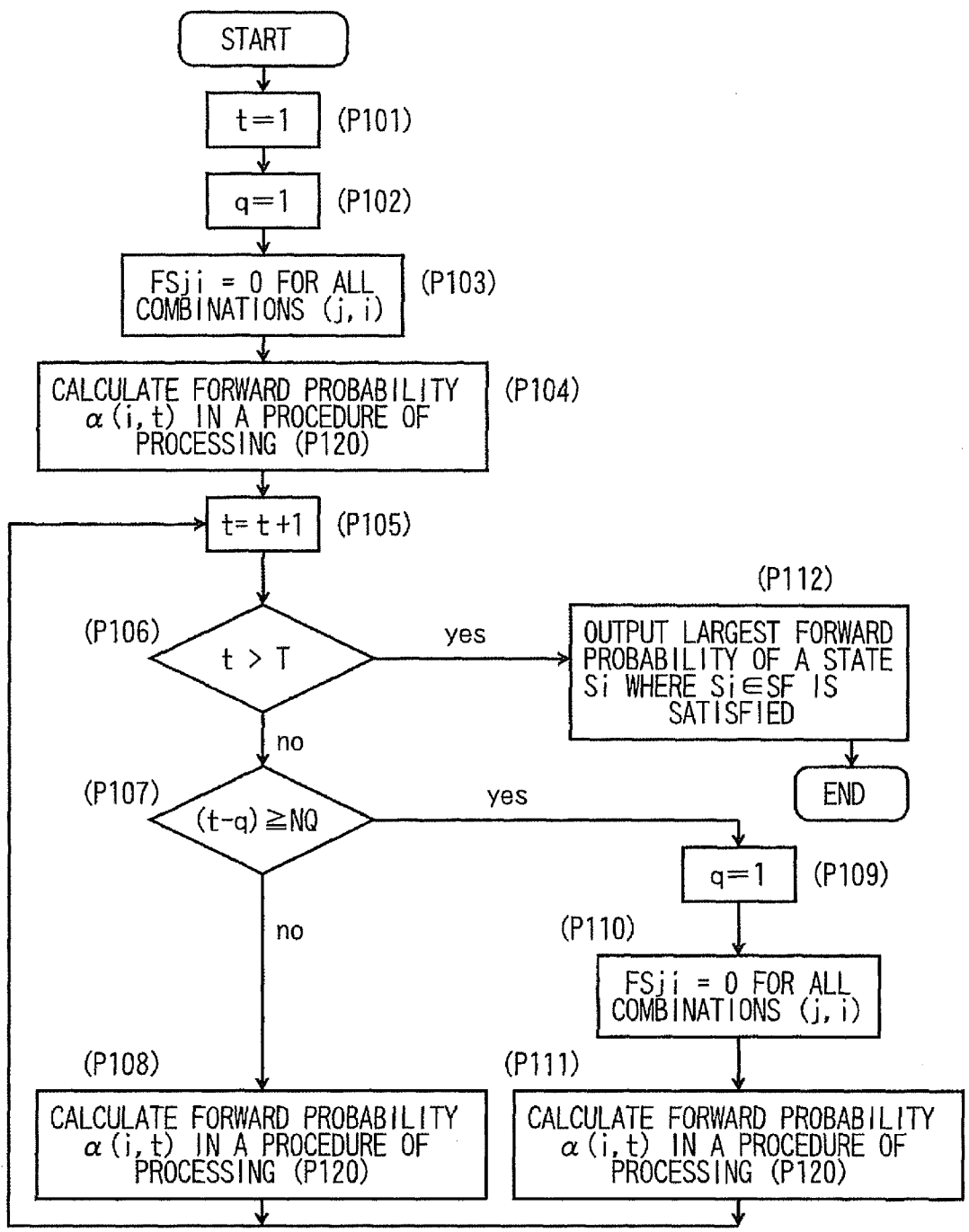
FIGS. 15-16 are flowcharts of the first embodiment.
Figure 16:
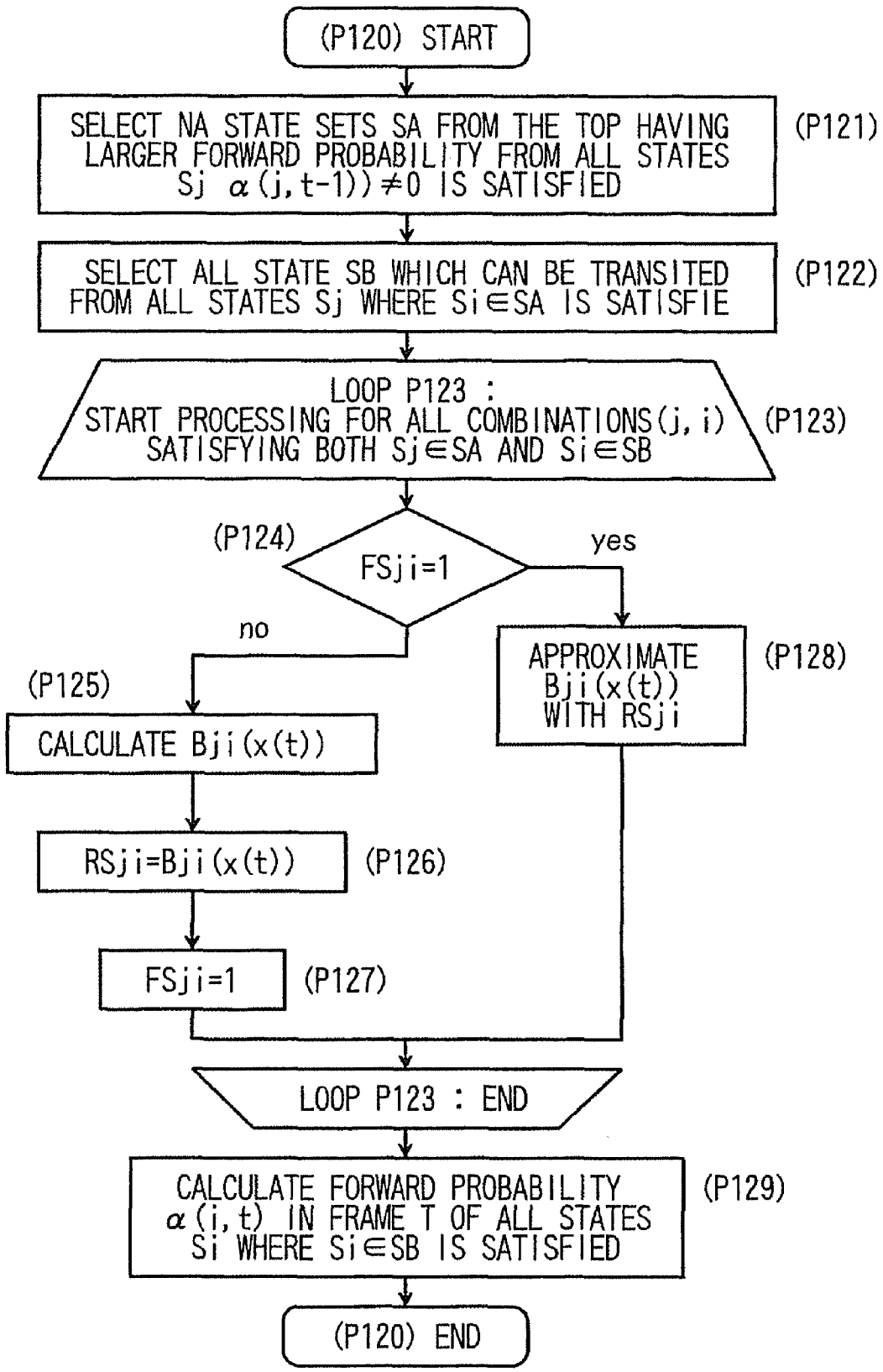
Figure 20:
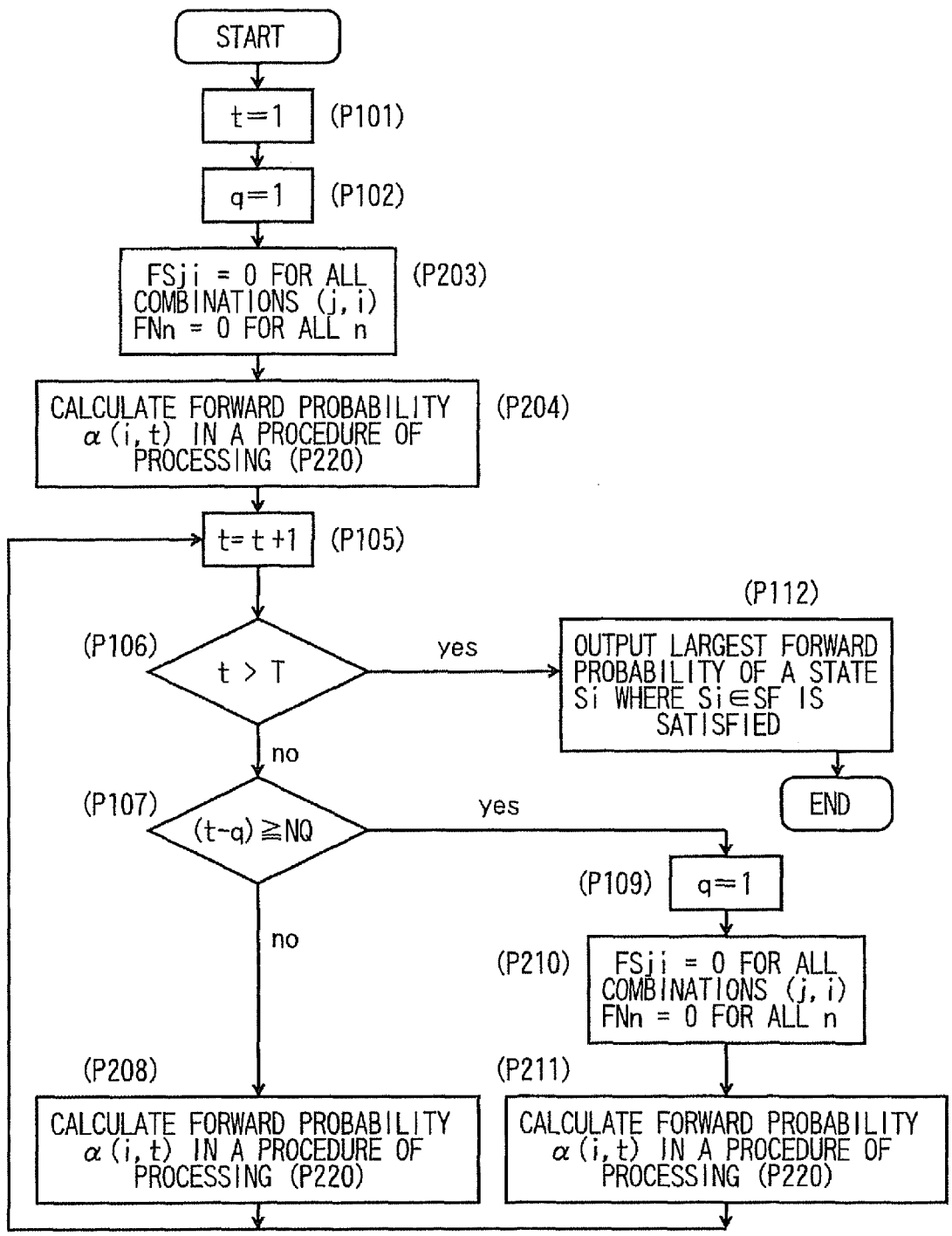
FIGS. 20-22 are flowcharts of the second embodiment.
Figure 21:
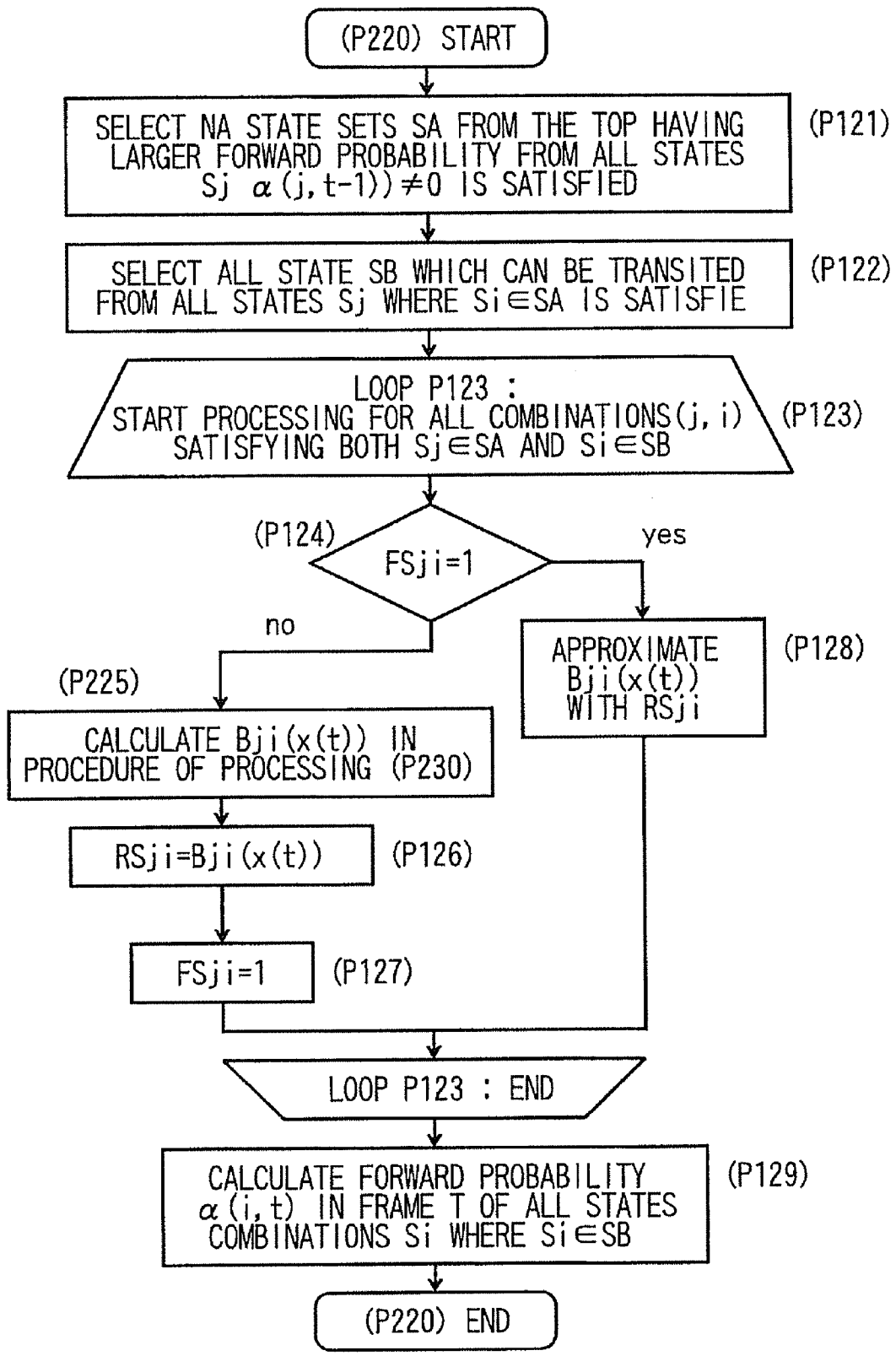

However, since the processing steps in FIG. 20 and FIG. 21 having the same reference numerals as those in FIG. 15 and FIG. 16 in the first embodiment are not modified from the first embodiment, description will be omitted here.

Description of the processing steps relating to the dictionary unit 103, the collating unit 104, the storage unit 106 and the determining unit 107 in the first embodiment should be taken also as the description of the operation relating to the dictionary unit 203, the collating unit 204, the storage unit 206 and the determining unit 207 in the second embodiment.

The processing in the flowchart in FIG. 20 will be described below in detail. This flowchart illustrates a procedure to the calculation of the forward probabilities α(i, t) in the respective frames and the procedure for obtaining the output probability P(X) of the voice characteristic vector sequence X in the frame t.

In Step P203, the determining unit 207 initializes the flag FSji to 0 for all the combinations (j, i) where 1≦j, i≦NS, and then initializes the flag FNn to 0 for all "n"s where 1≦n≦NN.

In Step P204, the collating unit 204 calculates the forward probability α(i, t) in the current frame t=1 in the procedure of the Step P200. In other words, the collating unit 204 obtains the forward probability in the frame 1. The step P200 will be described later in detail.

In Step P208, the collating unit 204 calculates the forward probability α(i, t) in the current frame t in the procedure in Step P220. In other words, the collating unit 204 obtains the forward probability of the frame t without renewing the standard frame q. The step 220 will be described later in detail.

In Step P210, the determining unit 207 initializes the flag FSji to 0 for all the combinations (j, i), where 1≦j, i≦NS. The determining unit 207 further initializes the flag FNn to 0 for all "n"s where 1≦n≦NN.

In Step P211, the collating unit 204 calculates the forward probability α(i, t) in the current frame t in the procedure of Step P220. In other words, the collating unit 204 renews the standard frame q, and then obtains the forward probability of the current frame t. Step P220 will be described later in detail.

(3) Calculation of Forward Probability α(i, t)

The processing of the flowchart in FIG. 21 will now be described in detail below. This flowchart schematically illustrates the calculation of the forward probabilities α(i, t) in the respective frames.

Figure 22:
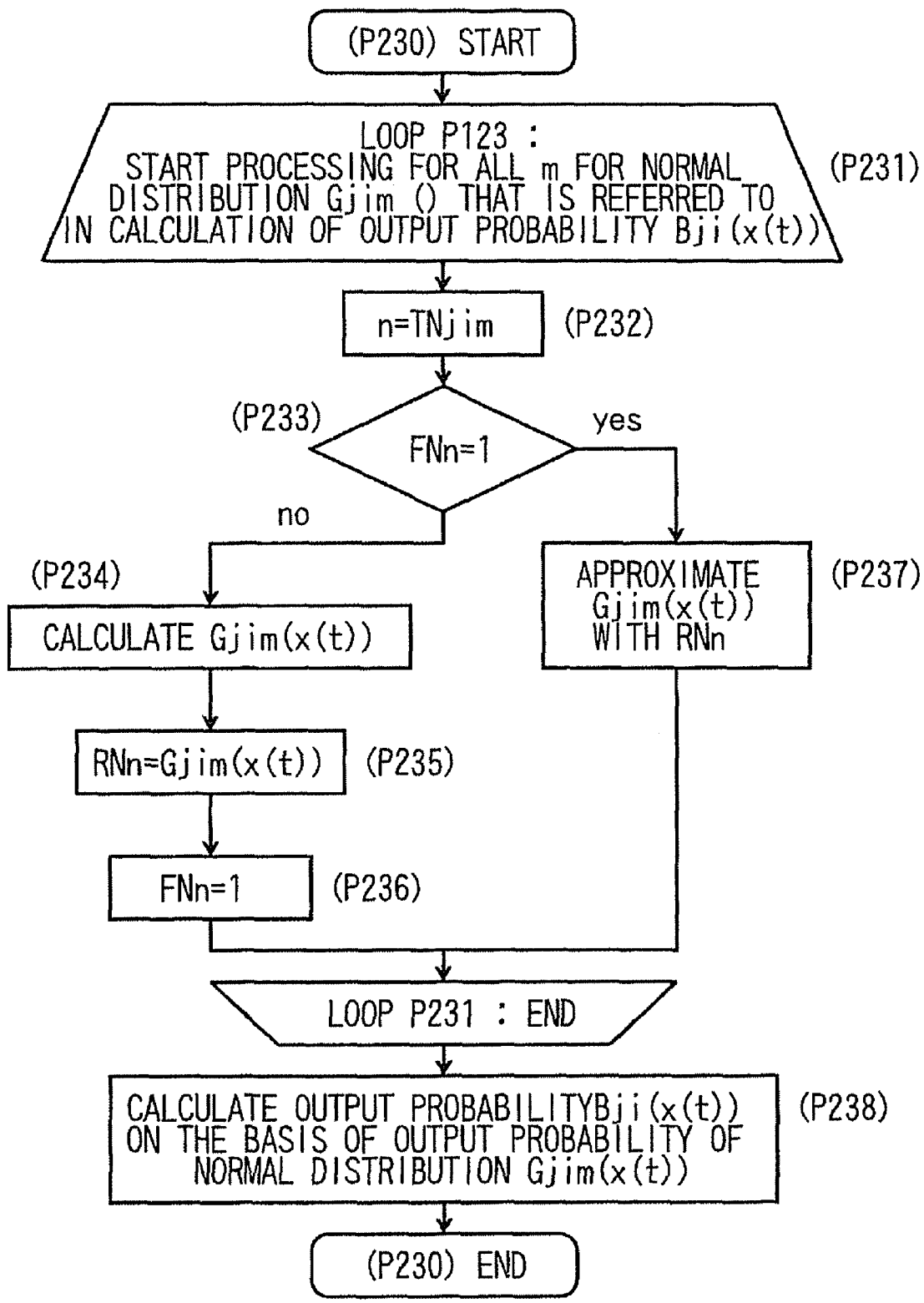

In Step P225, the collating unit 204 calculates the output probability Bji(x(t)) of the voice characteristic vector x(t) in the current frame t in the procedure of Step P230 shown on FIG. 22.

(4) Detail Description of Output Probability Bji(x(t))

Subsequently, the processing of the flowchart in FIG. 22 will be described below in detail. This flowchart illustrates the output probability Bji(x(t)) in detail.

In Step P231, the collating unit 204 executes Step P232 to Step P237 described later for all the m(1≦m≦M) of the normal distribution Gjim referred to by the calculation of the Bji(x(t)).

In Step P232, the dictionary unit 203 obtains an index n of the multi-dimensional normal distribution using the table TNjim that holds the index to the normal distribution. In other words, n=TNjim is established.

In Step P233, the determining unit 207 refers to the flag FNm according to the index n obtained in Step P232 and, when FNn=1 is satisfied, that is, when the output probability is stored in the output probability buffer RNn of the normal distribution of the storage unit 206, the procedure goes to Step P237. When FNn=1 is not satisfied, that is, when the output probability is not stored in the output probability buffer RNn of the normal distribution, the procedure goes to Step P234 to Step P236, where the output probability of the normal distribution is calculated and stored.

In Step P234, the collating unit 204 calculates the output probability Gjim(x(t)) of the voice characteristic vector x(t) in the current frame t for the normal distribution Gjim( )=N(μn, Σn) having the index n.

In Step P235, the storage unit 206 stores the output probability Gjim(x(t)) of the normal distribution calculated in Step P125 in the output probability buffer RNn of the normal distribution. In other words, RNn=Gjim(x(t)) is established.

In Step P236, the determining unit 207 set a numerical value 1 which indicates that the output probability is stored in the output probability buffer RNn of the normal distribution in the storage unit 206 to the flag FNn. In other words, FNn=1 is established.

In Step P237, the collating unit 204 approximates the output probability Gjim(x(t)) of the normal distribution with the output probability stored in the output probability buffer RNn of the storage unit 106. In other words, Gjim(x(t))=RNn is established.

In Step P238, the collating unit 204 calculates the output probability Bji(x(t)) in the current frame ton the basis of the output probability of the normal distribution calculated in the above-described Step P235 and the approximate value of the normal distribution obtained in the above-described step P228. When considering Step P231 to Step P237, the expressions for calculating the output probability Bji(x(t)) are the expression (16), the expression (17) and the expression (18) shown below. These three expressions are replacement for the expression (7) in the first embodiment.

For (m, n) which satisfies both n=TNjim and FNn=1, where Gjim( )=N(μn, Σn²), $$B1ji(x(t)) = \sum_m Wjim * Gjim(x(t)) \qquad (16)$$

For (m, n) which satisfies both n=TNjim and FNn=0, $$B2ji(x) = \sum_{m} Wjim * RNn \quad (17)$$

$$Bji(x(t))=B1ji(x(t))+B2ji(x(t)) \quad (18)$$

Since the calculation of the output probability Gjim(x(t)) of the normal distribution is performed only for (m, n) which satisfies both n=TNjim and FNn=1 in the expression (16), the expression (17) and the expression (18), the number of times of calculation of the output probability of the normal distribution is reduced significantly in comparison with the expression (7) in the second embodiment.

At this time, when the frame width with respect to the time change of the input voice is significantly small, the difference between the voice characteristic vectors temporally close to each other is also small, and hence it is expected that the difference between the output probability Gjim(x(t')) of the normal distribution and the Gjim(x(t)) becomes sufficiently small by setting NQ to an adequate value for q, t, t' which satisfies both (t−q)<NQ and q≦t'<t.

In other words, it is expected that RNn=Gjim(x(t')) becomes a desirable approximate value of Gjim(x(t)), where n=TNjim.

(5) Effects

In other words, in the voice recognition apparatus described in the second embodiment, the number of times of calculation of the normal distribution is significantly reduced in comparison with the calculation of the output probability with the expression (7) in the first embodiment by calculating the output probability on the basis of the expression (16), the expression (17) and the expression (18), and a desirable approximate value to that obtainable by the expression (7) may be obtained.

Consequently, in the voice recognition processing, the number of times of calculation of the normal distribution can be reduced, that is, the calculation cost of the calculation of the output probability is efficiently reduced without giving an adverse effect to the recognition performance. This is quite effective for reducing the calculation cost of the voice recognizing processing efficiently.

Third Embodiment

Figure 23:
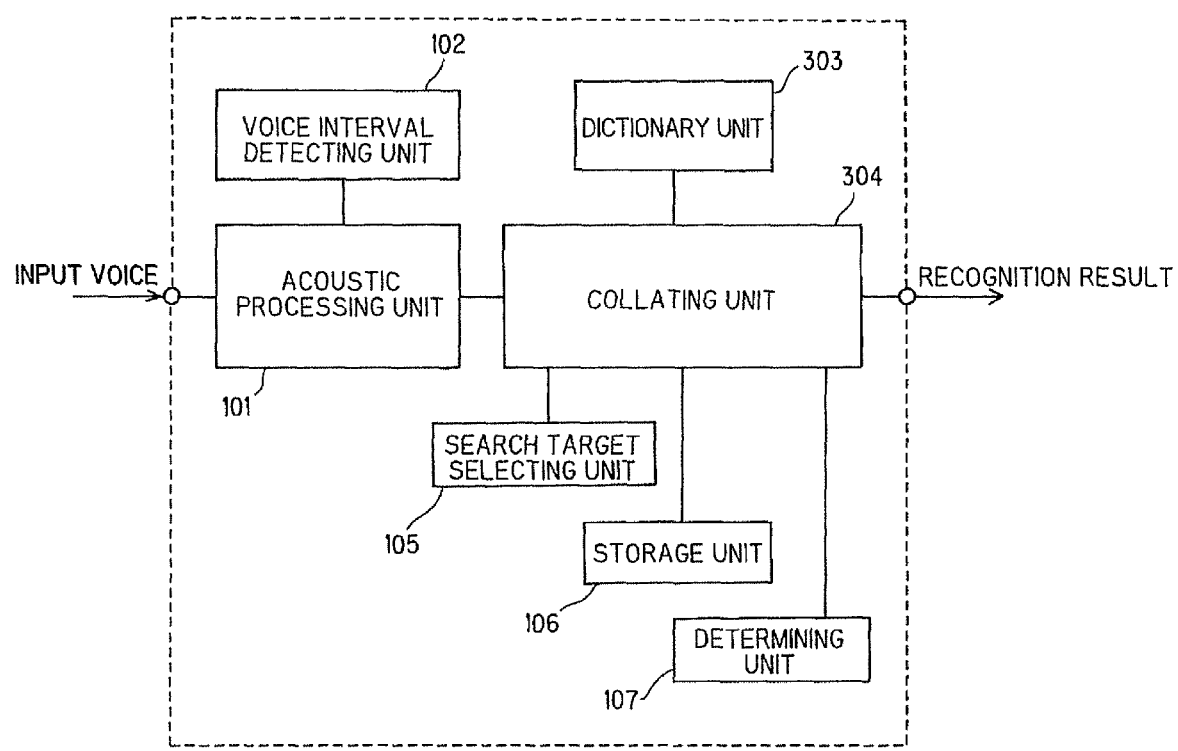
FIG. 23 is a block diagram of a voice recognition apparatus according to a third embodiment of the present invention.
Figure 24:
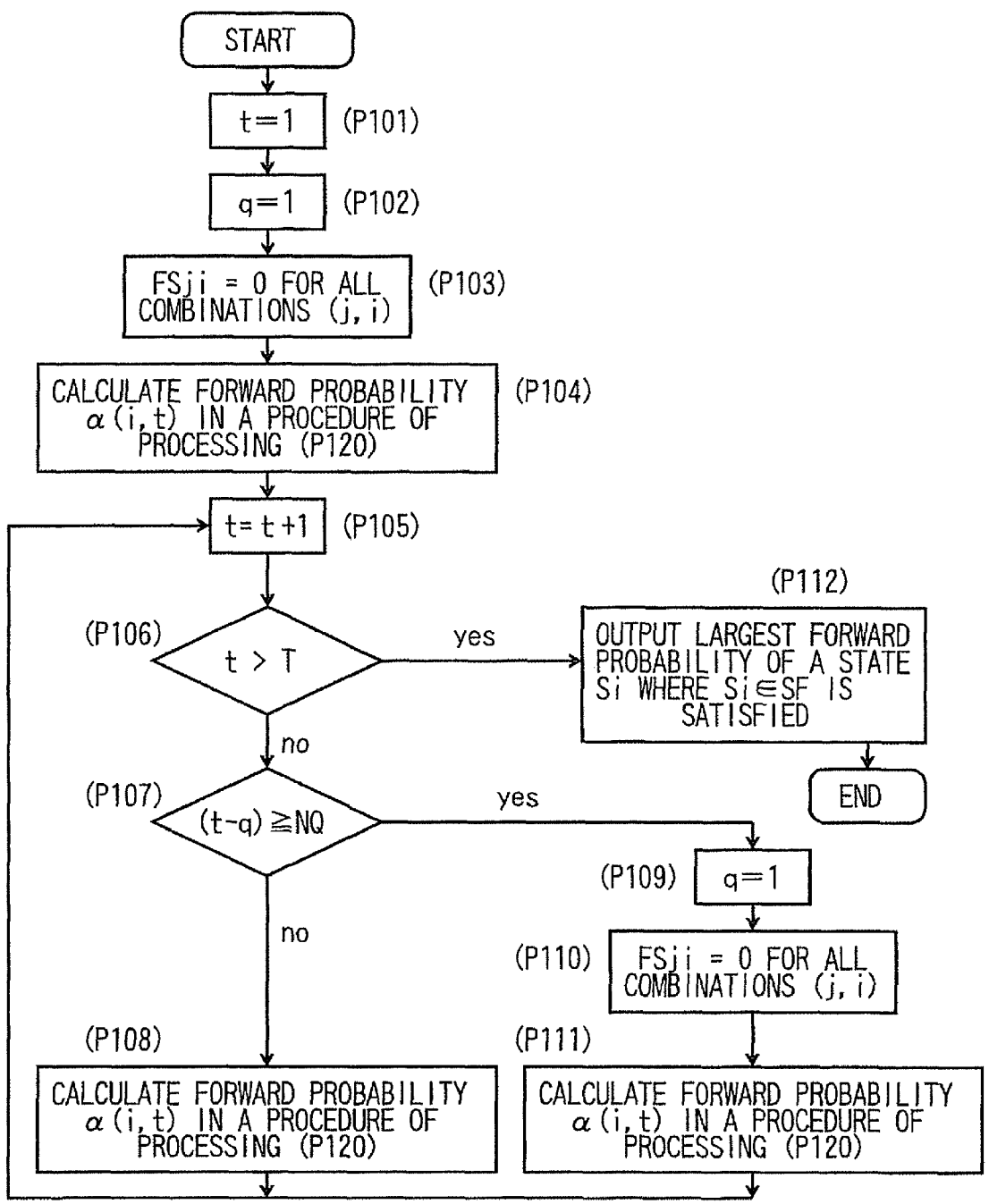
FIGS. 24-25 are flowcharts of the third embodiment.
Figure 25:
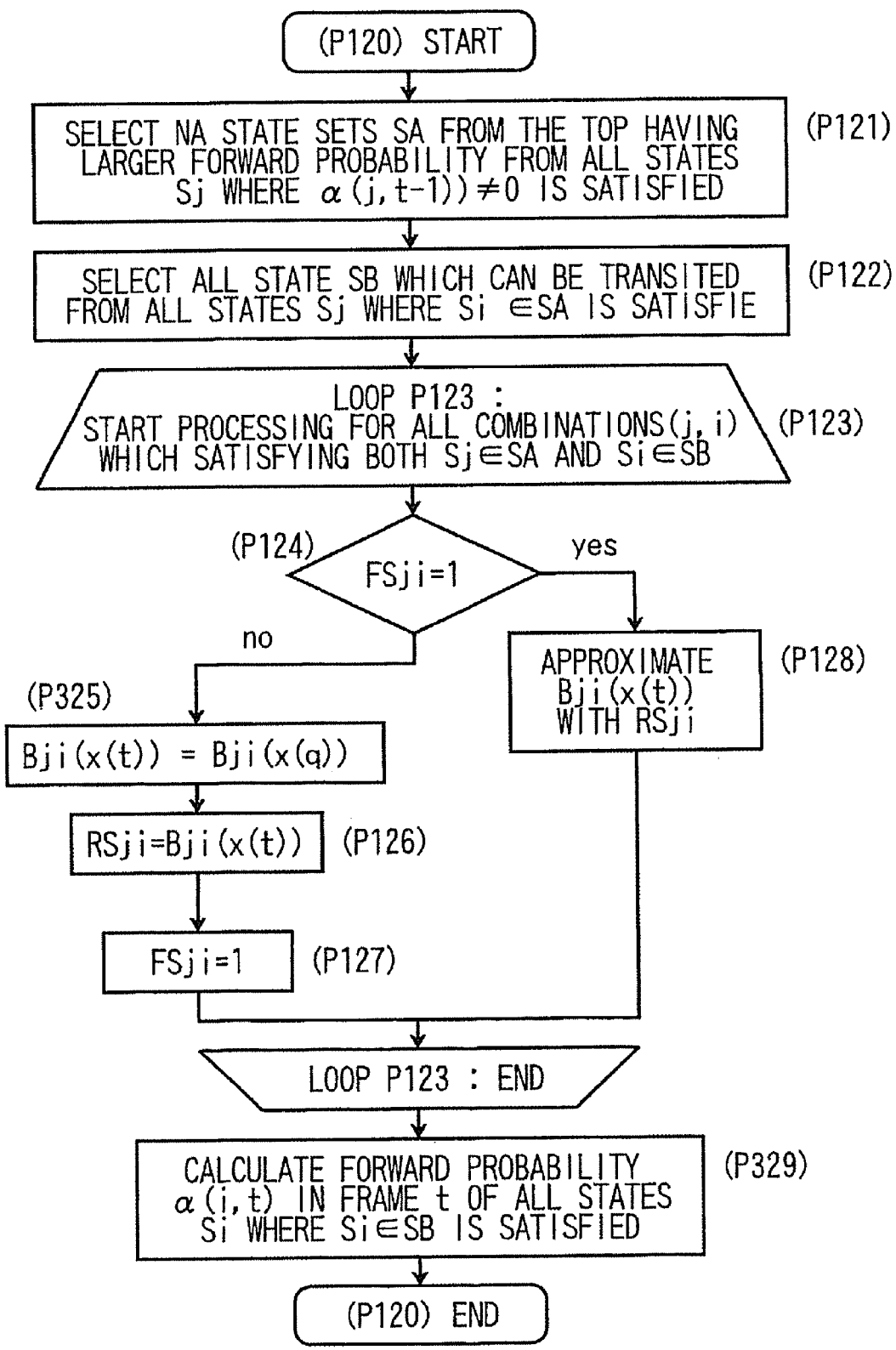

Referring now to FIG. 23 to FIG. 25, the voice recognition apparatus according to a third embodiment will be described.

(1) Configuration of Voice Recognition Apparatus

FIG. 23 is a block diagram showing an example of the configuration of the voice recognition apparatus according to the third embodiment.

The voice recognition apparatus shown in FIG. 23 includes the acoustic processing unit 101, the voice interval detecting unit 102, the dictionary unit 103, a collating unit 304, the search target selecting unit 105, the storage unit 106 and the determining unit 107.

Here, since the acoustic processing unit 101, the voice interval detecting unit 102, the dictionary unit 103, the search target selecting unit 105, the storage unit 106 and the determining unit 107 having the same reference numerals as those in FIG. 14 in the first embodiment are operated in the same manner as those in the first embodiment, description will be omitted here.

The collating unit 304 performs collation between the HMM and the voice characteristic vector sequence in the same manner as the collating unit 104 in the first embodiment. However, part of the operation is different from that of the collating unit 104. In other words, in the calculation of the forward probability in a certain frame t, when the calculation of the output probability of the voice characteristic vector is necessary, the output probability Bji(x(q)) of the voice characteristic vector x(q) of the standard frame q stored in the storage unit 106 is used as the approximate value of the output probability Bji(x(t)) of the voice characteristic vector x(t) in the current frame t.

(2) Calculation of Output Probability P(X)

Referring now to flowcharts in FIG. 24 and FIG. 25, a flow of processing for calculating the output probability P(X) of the voice characteristic vector sequence X in the HMM assigned to a certain category in the voice recognition apparatus shown in FIG. 23.

Since the processing steps having the same reference numerals as those in FIG. 15 and FIG. 16 in the first embodiment in FIG. 24 and FIG. 25 are not modified from the first embodiment, description will be omitted here.

The description of the processing step relating to the collating unit 104 in the first embodiment should be taken also as the description of the operation relating to the collating unit 304 in the fourth embodiment. The processing in the flowchart in FIG. 24 is the same as the flowchart in FIG. 15 in the first embodiment, description will be omitted.

The processing in the flowchart in FIG. 25 will be described in detail below. In this flowchart, Step P125 and Step P129 in the flowchart in FIG. 16 in the first embodiment are replaced by Step P325 and Step P329.

In Step P325, the collating unit 304 calculates the output probability Bji(x(q)) of the voice characteristic vector x(q) corresponding to the standard frame number q of the storage unit 106 with the expression (7) and the expression (8), and uses the calculated result as a substitution of the output probability Bji(x(t)) of the voice characteristic vector x(t) in the current frame t.

In Step P329, the forward probability α(i, t) in the current frame t is calculated on the basis of the approximate value of the output probability calculated in Step P325 described above and the approximate value of the output probability obtained in Step P128. The expressions for calculating the forward probability α(i, t) are the expression (19), the expression (20) and the expression (21) shown below. These three expressions are replacement for the expression (12), the expression (13) and the expression (14) in the second embodiment.

For (j, i) which satisfies all of FSji=0 and {j:Sj∈SA} and {i:Si∈SB}, $$\alpha1(i, t) = \max_{j}(Aji * Bji(x(q)) * \alpha(j, t-1)) \quad (19)$$

For (j, i) which satisfies all of FSji=1 and {j:Sj∈SA} and {i:Si∈SB}, $$\alpha2(i, t) = \max_{j}(Aji * RSji * \alpha(j, t-1)) \quad (20)$$

$$\alpha(i, t) = \max(\alpha1(i, t), \alpha2(i, t)) \quad (21)$$

What is claimed is:

1. An apparatus for recognizing voice from a supplied voice signal using a HMM (Hidden Markov Model) comprising:
an acoustic processing unit configured to acquire voice characteristic vectors for each of frames having a constant time width from the voice signal;
a standard frame storage unit configured to determine one of the frames as a standard frame and store a frame number of the standard frame;
a standard frame renewing, unit configured to, when a predetermined number of frames have passed over from the standard frame, reset and renew the standard frame to a frame which comes the predetermined number of frames after the standard frame, and repeat such resetting and renewing through last frame in sequence;
a first search range selecting unit configured to select a first search range of the HMM on basis of a beam search for the standard frame;
a first output probability calculating unit configured to calculate first output probabilities of voice characteristic vectors in respective transition paths within the first search range;
a first output probability storage unit configured to store the first output probabilities as combined with the respective transition paths;
a first output probability erasing unit configured to erase all the first output probabilities stored as combined with the transition paths when the standard frame is renewed;
a second search range selecting unit configured to select a second search range of the HMM in the each of frames on basis of the beam search for the each of frames within an interval from the standard frame to a next and new standard frame, when the standard frame is not yet renewed;
a second output probability calculating unit configured to calculate second output probabilities of the voice characteristic vectors in the current frame, of the voice characteristics vectors in the current frame or the standard frame, of the transition paths, when the first output probabilities as well as the second output probabilities in an interval from the standard frame to a frame immediately before a current frame are not yet stored;
a determining unit configured to determine whether the first output probabilities in the respective transition paths within the second search range in the current frame or the second output probabilities relating to past frames existing between the standard frame and the current frame are combined with the transition paths;
an approximate value setting unit configured to set the first output probabilities relating to the past frames between the standard frame and the current frame or the second output probabilities as approximate values of the second output probabilities of the transition paths when the first output probabilities or the second output probabilities relating to the past frames between the standard frame and the current frame are already stored as available;
a second output probability storage unit configured to store the second output probabilities anew combined with the transition paths;
a second output probability erasing unit configured to erase all the second output probabilities stored as combined with the transition paths when the standard frame is renewed;
a forward probability calculating unit configured to calculate the forward probabilities of the current frame from the forward probabilities of previous frame calculated in advance, all the approximate values of the current frame and all the second output probabilities; and
a voice recognizing unit configured to calculate the forward probabilities of the respective HMMs until the last frame and then provides a category assigned to the HMM which provides a largest forward probability for the last frame as a result of the voice recognition.

2. The apparatus of claim 1, wherein probability density functions in the first output probabilities and the second output probabilities are contaminated normal distributions,
wherein the HMM has a configuration in which an arbitrary normal distribution is commonly used by the plurality of probability density functions,
wherein when calculating the first output probabilities in the respective transition paths, the first output probability calculating unit calculates the output probabilities of the voice characteristic vectors for the respective normal distributions which constitute the probability density functions, and stores the results of calculation for the respective normal distributions combined with the corresponding normal distributions,
wherein the first output probability erasing unit erases all the first output probabilities and erases all the output probabilities of the voice characteristic vectors stored as combined with the normal distribution;
wherein when calculating the second output probability, the second output probability calculating unit;
(1) provides stored results of calculation as approximate values of the output probabilities of the normal distributions when the results of calculation combined with the normal distributions are already stored as available, and
(2) further calculates the output probabilities of the voice characteristic vectors for the normal distributions and stores anew the results of calculation in combination with the normal distributions when the results of calculation combined with the normal distributions are not yet stored,
regarding the output probabilities of the voice characteristic vectors for the respective normal distributions which constitute the probability density functions.

3. The apparatus of claim 1, wherein the standard frame storage unit stores the voice characteristic vectors of the new standard frame in addition to the frame number of the new standard frame,
wherein the standard frame renewing unit renews the voice characteristic vectors of the new standard frame in addition to the frame number of the new standard frame, and
wherein the second output probability calculating unit calculates the second output probabilities of the voice characteristic vectors of the new standard frame.

4. A method of recognizing voice from a supplied voice signal using a HMM (Hidden Markov Model) comprising:
acquiring voice characteristic vectors for each of frames having a constant time width from the voice signal;
determining one of the frames as a standard frame and stores a frame number of the standard frame;
resetting and renewing the standard frame to a frame which comes a predetermined number of frames after the standard frame when the predetermined number of frames have passed over from the standard frame, and repeat such resetting and renewing through last frame in sequence;
selecting a first search range of the HMM on basis of a beam search for the standard frame;
calculating first output probabilities of voice characteristic vectors in respective transition paths within the first search range;

storing the first output probabilities combined with the respective transition paths;

erasing all the first output probabilities stored as combined with the transition paths when the standard frame is renewed;

selecting a second search range of the HMM in the each of frames on basis of the beam search for the each of frames within an interval from the standard frame to a next and new standard frame, when the standard frame is not yet renewed;

calculating second output probabilities of the voice characteristic vectors in a current frame, of the voice characteristic vectors in the current frame or the standard frame, of the transition paths, when the first output probabilities as well as the second output probabilities in an interval from the standard frame to a frame immediately before the current frame are not yet stored;

determining whether the first output probabilities in the respective transition paths within the second search range in the current frame or the second output probabilities relating to past frames existing between the standard frame and the current frame are combined with the transition paths;

setting the first output probabilities relating to the past frames between the standard frame and the current frame or the second output probabilities as approximate values of the second output probabilities of the transition paths when the first output probabilities or the second output probabilities relating to the past frames between the standard frame and the current frame are already stored as available;

storing the second output probabilities anew combined with the transition paths;

erasing all the second output probabilities stored as combined with the transition paths when the standard frame is renewed;

calculating the forward probabilities of the current frame from the forward probabilities of previous frame calculated in advance, all the approximate values of the current frame and all the second output probabilities; and calculating the forward probabilities of the respective HMMs until the last frame and then providing a category assigned to the HMM which provides a largest forward probability for the last frame as a result of the voice recognition.

5. The method of claim 4, wherein probability density functions in the first output probabilities and the second output probabilities are contaminated normal distributions, wherein the HMM has a configuration in which an arbitrary normal distribution is commonly used by the plurality of probability density functions, wherein when calculating the first output probabilities in the respective transition paths, processing is made to calculate the output probabilities of the voice characteristic vectors for the respective normal distributions which constitute the probability density functions, and store the results of calculation for the respective normal distributions combined with the corresponding normal distributions, wherein when erasing the first output probability, processing is made to erase all the first output probabilities and erases all the output probabilities of the voice characteristic vectors stored as combined with the normal distribution;

wherein when calculating the second output probability, processing is made to;

(1) provide stored results of calculation as approximate values of the output probabilities of the normal distributions when the results of calculation combined with the normal distributions are already stored as available, and (2) further calculate the output probabilities of the voice characteristic vectors for the normal distributions and stores anew the results of calculation in combination with the normal distributions when the results of calculation combined with the normal distributions are not yet stored, regarding the output probabilities of the voice characteristic vectors for the respective normal distributions which constitute the probability density functions.

6. The method according to claim 4, comprising:

storing the voice characteristic vectors of the new standard frame in addition to the frame number of the new standard frame, renewing the voice characteristic vectors of the new standard frame in addition to the frame number of the new standard frame in said resetting and renewing, and calculating the second output probabilities of the voice characteristic vectors of the new standard frame.

7. A storage medium which stores a program for recognizing voice from a supplied voice signal using a HMM (Hidden Markov Model) by a computer, the program comprising instructions of:

acquiring voice characteristic vectors for each of frames having a constant time width from the voice signal;

determining one of the frames as a standard frame and stores a frame number of the standard frame;

resetting and renewing the standard frame to a frame which comes a predetermined number of frames after the standard frame when the predetermined number of frames have passed over from the standard frame, and repeat such resetting and renewing through last frame in sequence;

selecting a first search range of the HMM on basis of a beam search for the standard frame;

calculating first output probabilities of voice characteristic vectors in respective transition paths within the first search range;

storing the first output probabilities combined with the respective transition paths;

erasing all the first output probabilities stored as combined with the transition paths when the standard frame is renewed;

selecting a second search range of the HMM in the each of frames on the basis of the beam search for the each of frames within an interval from the standard frame to a next and new standard frame, when the standard frame is not yet renewed;

calculating second output probabilities of the voice characteristic vectors in a current frame, of the voice characteristic vectors in the current frame or the standard frame, of the transition paths, when the first output probabilities as well as the second output probabilities in an interval from the standard frame to a frame immediately before the current frame are not yet stored;

determining whether the first output probabilities in the respective transition paths within the second search range in the current frame or the second output probabilities relating to past frames existing between the standard frame and the current frame are combined with the transition paths;

setting the first output probabilities relating to the past frames between the standard frame and the current frame or the second output probabilities as approximate values of the second output probabilities of the transition paths when the results of calculation of the first output probabilities or the second output probabilities relating to the past frames between the standard frame and the current frame are already stored as available;

storing the second output probabilities anew combined with the transition paths;

erasing all the second output probabilities stored as combined with the transition paths when the standard frame is renewed;

calculating the forward probabilities of the current frame from the forward probabilities of previous frame calculated in advance, all the approximate values of the current frame and all the second output probabilities; and calculating the forward probabilities of the respective HMMs until the last frame and then providing a category assigned to the HMM which provides a largest forward probability for the last frame as a result of the voice recognition.

8. The medium according to claim 7, wherein probability density functions in the first output probabilities and the second output probabilities are contaminated normal distributions, wherein the HMM has a configuration in which an arbitrary normal distribution is commonly used by the plurality of probability density functions, wherein when calculating the first output probabilities in the respective transition paths, the instructions realize processing to calculate the output probabilities of the voice characteristic vectors for the respective normal distributions which constitute the probability density functions, and store the results of calculation for the respective normal distributions combined with the corresponding normal distributions, wherein when erasing first output probability, the instructions realize processing to erase all the results of calculation of the first output probabilities and, in addition, erases all the results of calculation of the output probabilities of the voice characteristic vectors stored combined with the normal distribution;

wherein when calculating the second output probability, the instructions realize processing to;

(1) provide stored results of calculation as approximate values of the output probabilities of the normal distributions when the results of calculation combined with the normal distributions are already stored as available, and (2) further calculates the output probabilities of the voice characteristic vectors for the normal distributions and stores anew the results of calculation in combination with the normal distributions when the results of calculation combined with the normal distributions are not yet stored, regarding the output probabilities of the voice characteristic vectors for the respective normal distributions which constitute the probability density functions.

9. The medium according to claim 7, the program further comprising instructions of:

storing the voice characteristic vectors of the new standard frame in addition to the frame number of the new standard frame, renewing the voice characteristic vectors of the new standard frame in addition to the frame number of the new standard frame in said setting and renewing, and calculating the second output probabilities of the voice characteristic vectors of the new standard frame in the instruction of calculating.

\* \* \* \* \*